United States Patent
Koyabu et al.

(10) Patent No.: US 11,054,388 B2
(45) Date of Patent: Jul. 6, 2021

(54) GAS SENSOR CONTROL DEVICE

(71) Applicant: DENSO CORPORATION, Kariya (JP)

(72) Inventors: Tadakatsu Koyabu, Kariya (JP); Tomoo Kawase, Kariya (JP); Yuki Murayama, Kariya (JP); Ryozo Kayama, Kariya (JP); Akari Hasegawa, Kariya (JP); Shoki Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 450 days.

(21) Appl. No.: 15/988,329

(22) Filed: May 24, 2018

(65) Prior Publication Data
US 2018/0340909 A1 Nov. 29, 2018

(30) Foreign Application Priority Data
May 26, 2017 (JP) .............................. JP2017-104899

(51) Int. Cl.
| | |
|---|---|
| *G01N 27/417* | (2006.01) |
| *G01N 27/416* | (2006.01) |
| *G01N 27/419* | (2006.01) |
| *F01N 11/00* | (2006.01) |
| *G01M 15/10* | (2006.01) |
| *G01N 27/406* | (2006.01) |
| *G01N 27/407* | (2006.01) |
| *G01N 27/409* | (2006.01) |
| *G01N 27/41* | (2006.01) |

(52) U.S. Cl.
CPC ....... *G01N 27/4163* (2013.01); *F01N 11/007* (2013.01); *G01M 15/104* (2013.01); *G01N 27/409* (2013.01); *G01N 27/4065* (2013.01); *G01N 27/4075* (2013.01); *G01N 27/41* (2013.01); *G01N 27/419* (2013.01); *G01N 27/4175* (2013.01)

(58) Field of Classification Search
None
See application file for complete search history.

(56) References Cited

U.S. PATENT DOCUMENTS

| | | | |
|---|---|---|---|
| 2002/0050455 A1 | 5/2002 | Kurokawa et al. | |
| 2003/0121311 A1 | 7/2003 | Tomura et al. | |
| | (Continued) | | |

FOREIGN PATENT DOCUMENTS

| | | |
|---|---|---|
| JP | 2009-175013 | 8/2009 |
| JP | 2015-059926 | 3/2015 |

*Primary Examiner* — Jill E Culler
(74) *Attorney, Agent, or Firm* — Nixon & Vanderhye P.C.

(57) ABSTRACT

In a gas sensor, a pump cell adjusts a concentration of oxygen in a gas chamber based of a pump cell supply voltage. A sensor cell detects a concentration of a specific gas in a detection target gas after the pump cell has adjusted the concentration of oxygen. In a sensor control unit, a voltage switching part adjusts the pump cell supply voltage to be supplied to the pump cell. A pump cell output control part adjusts a variation range of a pump cell output current of the pump cell before and after a voltage switching process of the pump cell supply voltage to be within a predetermined variation range. A deteriorated state detection part detects a deteriorated state ratio of the sensor cell based on variation of an output current of the sensor cell due to the voltage switching process performed by the voltage switching part.

10 Claims, 13 Drawing Sheets

(56) References Cited

U.S. PATENT DOCUMENTS

| | | | |
|---|---|---|---|
| 2004/0000479 A1* | 1/2004 | Katafuchi | G01N 27/419 204/424 |
| 2004/0221641 A1 | 11/2004 | Moritsugu et al. | |
| 2009/0242427 A1* | 10/2009 | Muroguchi | G01N 27/419 205/781 |
| 2016/0223488 A1 | 8/2016 | Kayama et al. | |
| 2017/0184536 A1 | 6/2017 | Kawamoto et al. | |
| 2017/0219513 A1 | 8/2017 | Kayama et al. | |

* cited by examiner

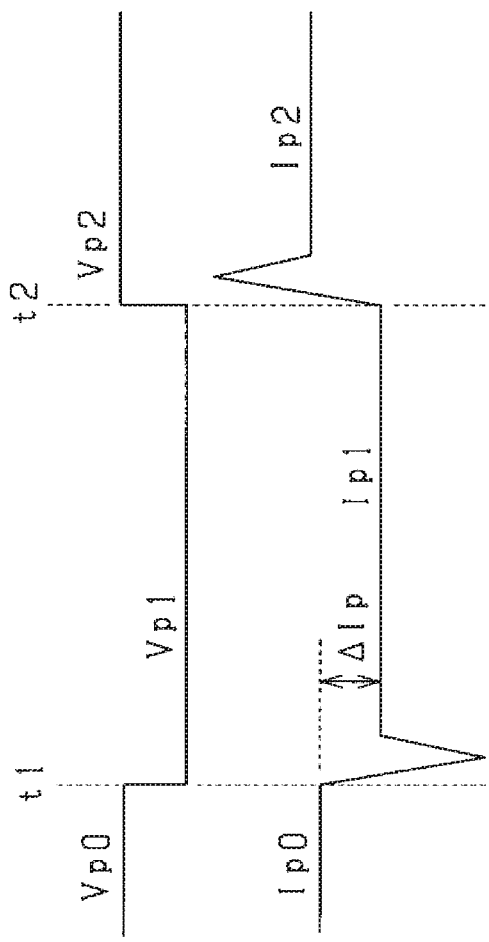
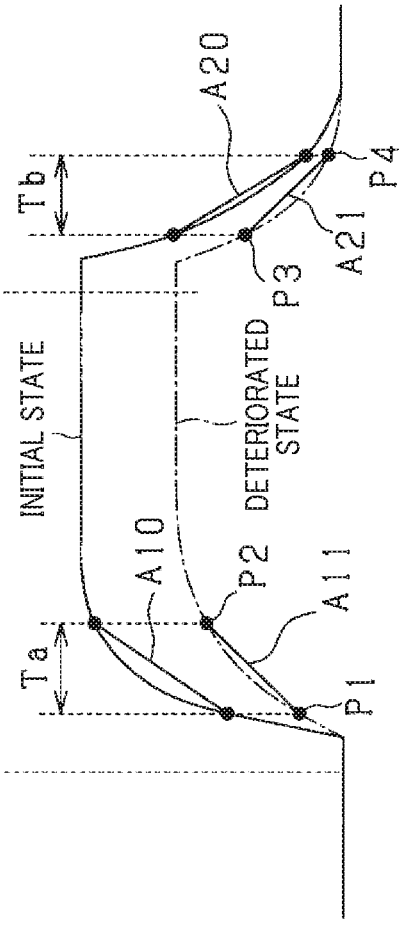
FIG. 4A
FIG. 4B
FIG. 4C

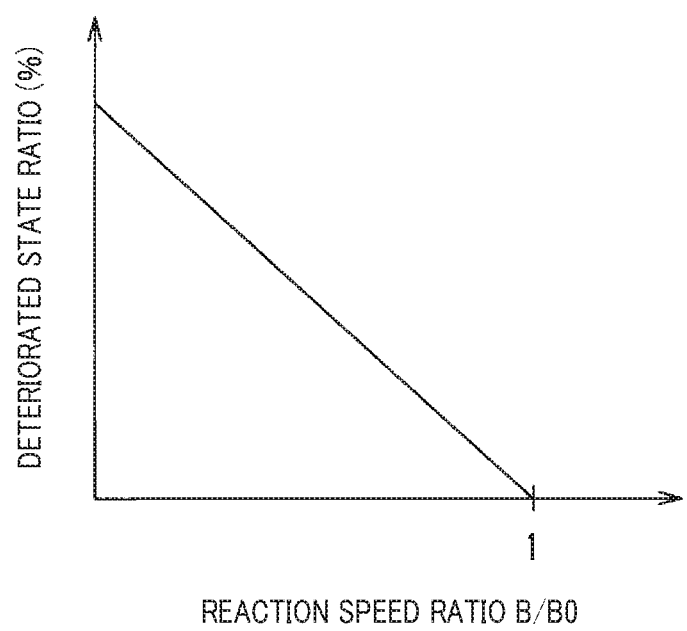

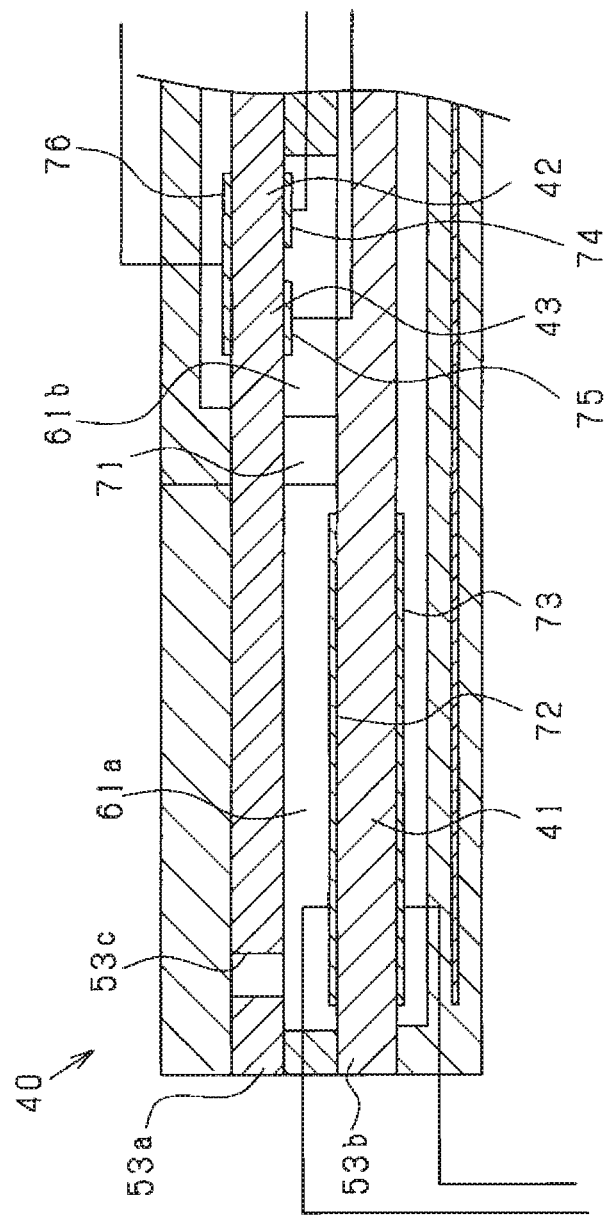

GAS SENSOR CONTROL DEVICE

CROSS-REFERENCE TO RELATED APPLICATION

This application is related to and claims priority from Japanese Patent Application No. 2017-104899 filed on May 26, 2017, the contents of which are hereby incorporated by reference.

BACKGROUND OF THE INVENTION

1. Field of the Invention

The present invention relates to gas sensor control devices capable of detecting a sensor failure, for example, of detecting deterioration of a sensor cell in a sensor element of a gas sensor.

2. Description of the Related Art

There has been known and widely used a nitrogen oxide (NOx) sensor as a gas sensor which is capable of detecting a concentration of a specific gas component contained in a detection target gas such as exhaust gas emitted from an internal combustion engine.

For example, patent document 1, Japanese patent laid open publication No. 2009-175013 has disclosed a NOx sensor having a three cell structure composed of a pump cell, a monitor cell and a sensor cell. The pump cell discharges oxygen in exhaust gas which has been introduced into a gas chamber in the gas sensor. The monitor cell detects a concentration of residual oxygen, which has passed through the pump cell, contained in the gas chamber. On the other hand, the sensor cell detects a concentration of NOx contained in the gas which has passed through the pump cell.

When such a NOx sensor deteriorates due to use for a long time and a NOx sensor failure occurs, it is difficult for the NOx sensor to detect a correct concentration of NOx contained in a detection target gas such as exhaust gas. This often causes a problem of increasing exhaust gas emission from motor vehicles in which the NOx sensor is mounted on an exhaust gas system of a motor vehicle.

In order to solve the conventional problems, various countermeasure methods have been proposed for detecting a NOx sensor failure, i.e. for detecting a deteriorated state of a NOx sensor. For example, patent document 1 has disclosed a method of forcedly varying a pump cell supply voltage to be supplied to a pump cell, and of detecting a sensor cell output current of the sensor cell which varies due to the switching or changing of the pump cell supply voltage to be supplied to the pump cell. The method of the patent document 1 detects a deteriorated state of the NOx sensor on the basis of a change amount of the sensor cell output current of the sensor cell.

However, the method disclosed in the patent document 1 has the following drawback. In order to detect the deteriorated state of the NOx sensor, a pump cell supply voltage to be supplied to the pump cell is switched, i.e. the voltage switching process of the pump cell voltage is performed. Before the execution of the voltage switching process of the pump cell supply voltage, the pump cell supply voltage depends on a concentration of oxygen remaining in a detection target gas, and the output, and a pump cell current of the pump cell becomes a given value.

In a case in which the detection target gas such as exhaust gas contains a high concentration of oxygen before the execution of the voltage switching process of the pump cell supply voltage, the output of the pump cell has a significantly wide variation range when the voltage switching process of the pump cell supply voltage is performed. This phenomenon provides negatively influences to the detection results of the deteriorated state of the sensor cell performed based on the output of the sensor cell because the output of the sensor cell varies due to the switching or changing of the output of the pump cell.

SUMMARY

It is therefore desired to provide a gas sensor control device capable of detecting deterioration of a sensor cell, i.e. of detecting a deteriorated state of the sensor cell in a sensor element of a gas sensor with high accuracy.

In accordance with an aspect of the present invention, there is provided a gas sensor control device capable of controlling a gas sensor. The gas sensor has a pump cell, a sensor cell and a gas chamber. The pump cell receives a pump cell supply voltage and adjusts a concentration of an oxygen gas component contained in a detection target gas introduced into the gas chamber on the basis of the received pump cell supply voltage. The sensor cell detects a concentration of a specific gas component contained in the detection target gas after the pump cell has adjusted the concentration of the oxygen gas component contained in the detection target gas. The gas sensor control device has a computer system having a central processing unit. The computer system has a voltage switching part, a pump cell output control part and a deteriorated state detection part. The voltage switching part performs a voltage switching process of a pump cell supply voltage for switching the pump cell supply voltage to be supplied to the pump cell in the gas sensor. The pump cell output control part adjusts a variation range of a pump cell output current of the pump cell before and after the voltage switching process of the pump cell supply voltage within a predetermined variation range. The deteriorated state detection part detects a deteriorated state of the sensor cell on the basis of variation of a sensor cell output current of the sensor cell caused by the voltage switching process of the pump cell supply voltage performed by the voltage switching part.

The voltage switching part performs the voltage switching process of the pump cell supply voltage so as to switch the pump cell supply voltage. The switched pump cell supply voltage is supplied to the pump cell in the sensor element of the gas sensor. A deteriorated state of the sensor cell is detected on the basis of the variation of the sensor cell output current of the sensor cell due to the pump cell supply voltage switched by the voltage switching process. The pump cell output control part adjusts the variation range of the pump cell output current of the pump cell before and after the pump cell supply voltage has been switched. Finally, the deteriorated state detection part detects the deteriorated state of the sensor cell on the basis of the variation of the sensor cell output current of the sensor cell due to the pump cell supply voltage switched by the voltage switching part. In this case, when the detection target gas such as exhaust gas has oxygen of a high concentration before the pump cell supply voltage is switched, the variation range of the pump cell output current of the pump cell significantly varies, i.e. significantly increases when the pump cell supply voltage is switched. This often provides negatively influences to the correct detection for detecting the deteriorated state (i.e. the degree of deterioration) of the sensor cell performed on the basis of the variation of the sensor cell output current of the sensor cell.

In the gas sensor control device according to the present invention having the improved structure and behavior, because the pump cell output control part limits the variation range of the pump cell output current of the pump cell before and after the execution of the voltage switching process to be within the predetermined variation range, this makes it possible to suppress the variation range of the pump cell output current of the pump cell from being significantly increased, and to allow the variation range of the pump cell output current of the pump cell to be within the predetermined variation range. As a result, this control makes it possible to suppress the reduction of the detection accuracy of the deteriorated state of the sensor cell. The improved structure of the gas sensor control device according to the present invention correctly detects the deteriorated state of the sensor cell in the sensor element of the gas sensor.

BRIEF DESCRIPTION OF THE DRAWINGS

A preferred, non-limiting embodiment of the present invention will be described by way of example with reference to the accompanying drawings, in which:

FIG. 4A is a graph showing a time change of a pump cell supply voltage;

FIG. 4B is a graph showing a time change of a pump cell current;

FIG. 4C is a graph showing a time change of transient response characteristics of a sensor cell current as an output of the sensor cell in the sensor element in each NOx sensor due to a deteriorated state after years of use;

FIG. 10 is a graph showing a relationship between a reaction speed ratio and a deteriorated state ratio of the NOx gas sensor;

FIG. 13 is a view showing a cross section of a structure of a NOx sensor according to a modification of the first to third exemplary embodiments of the present invention.

DETAILED DESCRIPTION OF THE PREFERRED EMBODIMENTS

Figure 1:
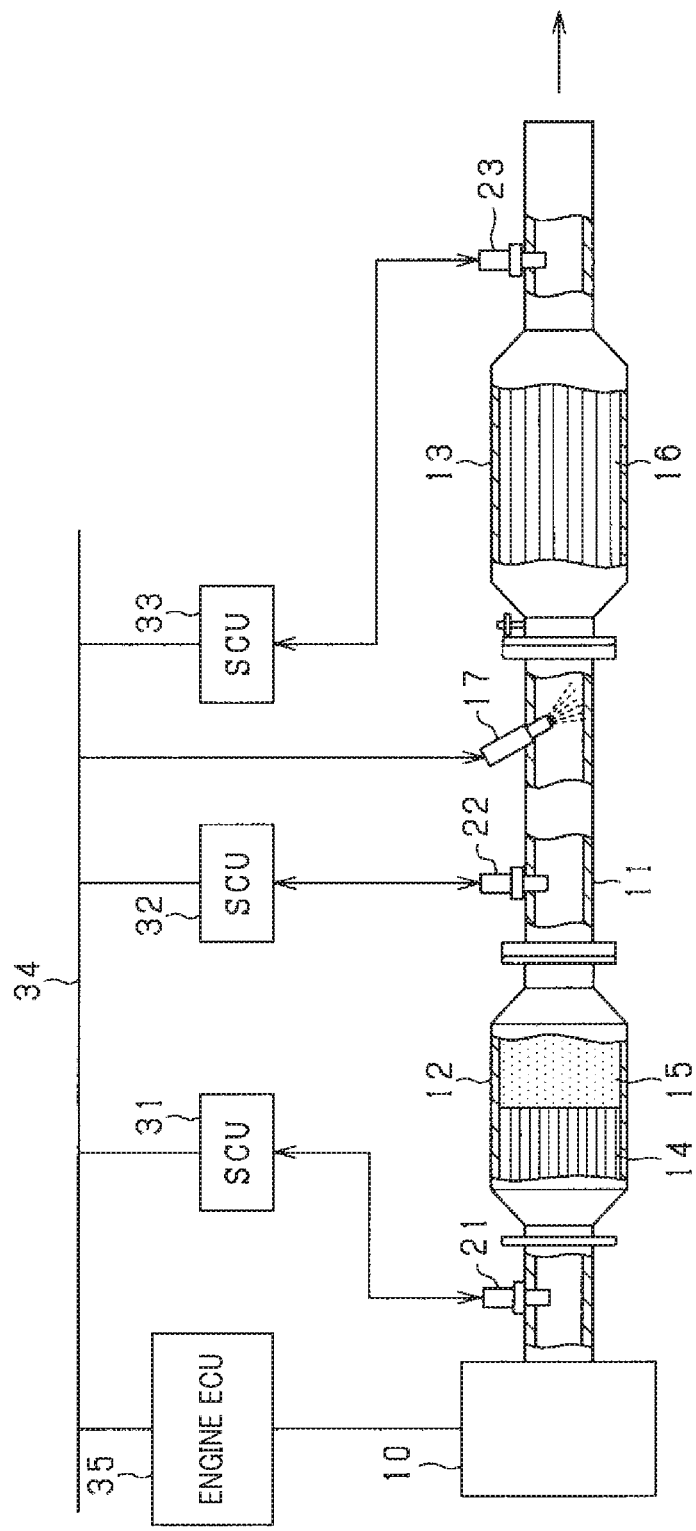
FIG. 1 is a view showing a schematic structure of an engine exhaust system equipped with NOx sensors and gas sensor control devices (SCUs and an engine ECU) according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

The present invention will provide various a gas sensor control device according to each of exemplary embodiments and a modification thereof. The gas sensor control device is equipped with a NOx sensor. The NOx gas sensor is capable of detecting a concentration of nitrogen oxide (NOx) contained in exhaust gas as a detection target emitted from an internal combustion engine such as a diesel engine mounted on a vehicle. The gas sensor control device performs a control process of the NOx sensor. The same reference numbers and characters used in the first to third exemplary embodiments and the modifications thereof represent the same components.

First Exemplary Embodiment

A description will be given of an engine exhaust system equipped with an exhaust gas purification system capable of purifying exhaust gas emitted from an internal combustion engine such as a diesel engine mounted on a vehicle.

FIG. 1 is a view showing a schematic structure of an engine exhaust system equipped with NOx sensors 21, 22 and 23, sensor control units (SCU) 31 to 33 as the gas sensor control devices, and an engine electronic control unit (engine ECU) 35 as the gas sensor control device according to the first exemplary embodiment of the present invention. The SCU 31 to 33 are arranged correspond to the NOx sensors 21, 22 and 23, respectively.

As shown in FIG. 1, the exhaust gas purification system is mounted on the engine exhaust system. The exhaust gas purification system is capable of purifying exhaust gas emitted from a diesel engine 10. The exhaust gas purification system has an exhaust gas pipe 11 which forms an exhaust gas passage. The exhaust gas pipe 11 is connected to the diesel engine 10.

An oxygen catalyst converter 12 and a selective reduction catalyst converter 13 (hereinafter, the SCR converter 13) are arranged, in this order, from the diesel engine 10 side on the exhaust gas pipe 11.

The oxygen catalyst converter 12 has a diesel catalyst converter 14 and a diesel particulate filter 15 (hereinafter, the DPF 15). The SCR converter 13 has a SCR catalyst 16 as a selective reduction type catalyst. Further, a urea water addition valve 17 is arranged between the oxygen catalyst converter 12 and the SCR converter 13 in the exhaust gas pipe 11. The urea water addition valve 17 supplies urea water (i.e. aqueous urea solution) as a reduction agent into the exhaust gas which is flowing in the exhaust gas pipe 11.

The oxygen catalyst converter 12 accommodates a diesel oxygen catalyst 14. The diesel oxygen catalyst 14 in the oxygen catalyst converter 12 is composed of a support made of ceramic, an oxide mixture and a noble metal catalyst. The oxide mixture is composed of aluminum oxide, cerium dioxide and zirconium dioxide. The noble metal catalyst comprising platinum, palladium and rhodium. The diesel oxygen catalyst 14 oxidizes hydrocarbon, carbon monoxide, and nitrogen oxide contained in exhaust gas as a detection target gas, i.e. purifies exhaust gas. Further, the diesel oxygen catalyst 14 generates heat energy during the catalyst reaction to oxidze those specific gases contained in exhaust gas, and the generated heat energy increases a temperature of the purified exhaust gas.

The DPF in the oxygen catalyst converter 12 is composed of a honeycomb structural body made of porous ceramics. In the honeycomb structural body, the porous ceramics support the platinum group such as platinum, palladium and rhodium. The DPF 15 collects particulate matter contained in exhaust gas. The collected particulate matter is accumulated on partition walls in the honeycomb structural body. After a predetermined elapse of time, the honeycomb structural body is burned. This burning process oxidizes the particulate matter accumulated on the partition walls and eliminates them from the honeycomb structural body so as to purify the honeycomb structural body. The burning process uses heat energy generated in the diesel oxygen catalyst 14. Further, the diesel oxygen catalyst 14 further contains an additive. The presence of the additive in the diesel oxygen catalyst 14 reduces a critical combustion temperature of particulate matter.

The SCR converter 13 is an after treatment device of the oxygen catalyst converter 12, i.e. reduce NOx to nitrogen and water. For example, there is a catalyst, as the SCR catalyst 16, in which platinum Pt is supported on a surface of a base member made of zeolite or alumina. When the catalyst has a temperature within an activation temperature range, urea water is added to the catalyst, NOx is reduced and the exhaust gas is purified.

The NOx sensors 21, 22 and 23 of a limiting current type gas sensor are arranged in the exhaust gas pipe 11 at the upstream side of the oxygen catalyst converter 12, at the upstream side of the urea water addition valve 17 between the oxygen catalyst converter 12 and the SCR converter 13, and at the downstream side of the SCR converter 13, respectively.

Each of the NOx sensors 21, 22 and 23 detects a concentration of NOx contained in exhaust gas at corresponding detection point at which each of the NOx sensors 21, 22 and 23 are located. It is acceptable to add or reduce the total number of the NOx sensors in the exhaust gas pipe 11.

As shown in FIG. 1, the NOx sensors 21, 22 and 23 are connected to the sensor control units (SCU) 31, 32 and 33, respectively. Each of the NOx sensors 21, 22 and 23 transmits detection signals to the corresponding SCU 31, 32 and 33. Each of the SCU 31, the SCU 32 and the SCU 33 is an electronic control device composed of a computer system having a microcomputer and peripheral circuits. The microcomputer is composed of a central processing unit (CPU), various types of memory units such as read only memory (ROM) and random access memory (RAM), etc. Each of the SCU 31, the SCU 32 and the SCU 33 receives the detection signals (as limiting current signals) transmitted from the corresponding NOx sensor 21, 22 and 23, and calculates a concentration of oxygen (O2) gas component and a concentration of NOx, etc, as a specific gas component contained in the exhaust gas on the basis of the received detection signals.

The SCUs 31, 32 and 33 are connected to communication lines 34 as a CAN bus, etc. That is, the SCUs 31, 32 and 33 are connected to various types of electronic control units (for example, an engine ECU 35), respectively through the communication lines 34. For example, various information can be communicated between the SCUs 31, 32 and 33 and the engine ECU 35.

The SCUs 31, 32 and 33 transmit to the engine ECU 35 various types of information regarding a concentration of oxygen and a concentration of NOx contained in exhaust gas. The engine ECU 35 is an electronic control device equipped with a central processing unit (CPU), various types of memories and peripheral circuits. The engine ECU 35 performs the control of the diesel engine 10 and various kinds of devices of the exhaust gas system. The engine ECU 35 performs a fuel injection control on the basis of an acceleration pedal opening and an engine rotation speed.

The engine ECU 35 performs a urea water addition control through a urea water addition valve 17 on the basis of the concentration of NOx detected by each of the NOx sensors 21, 22 and 23. In more detail, the engine ECU 35 calculates a urea water addition amount on the basis of the concentration of NOx detected by the NOx sensors 21 and 22 arranged at the upstream side of the SCR converter 13. Further, the SCR converter 13 performs a feedback control of the urea water addition amount so that the concentration of NOx detected by the NOx sensor 23 located at the downstream side of the SCR converter 13 is reduced as small as possible. The engine ECU 35 adjusts the operation of the urea water addition valve 17 on the basis of the urea water addition amount.

Next, a description will be given of the structure of the NOx sensors 21, 22 and 23. Because the NOx sensors 21, 22 and 23 have the same structure with each other, the structure of the NOx sensor 21 will be explained.

Figure 2:
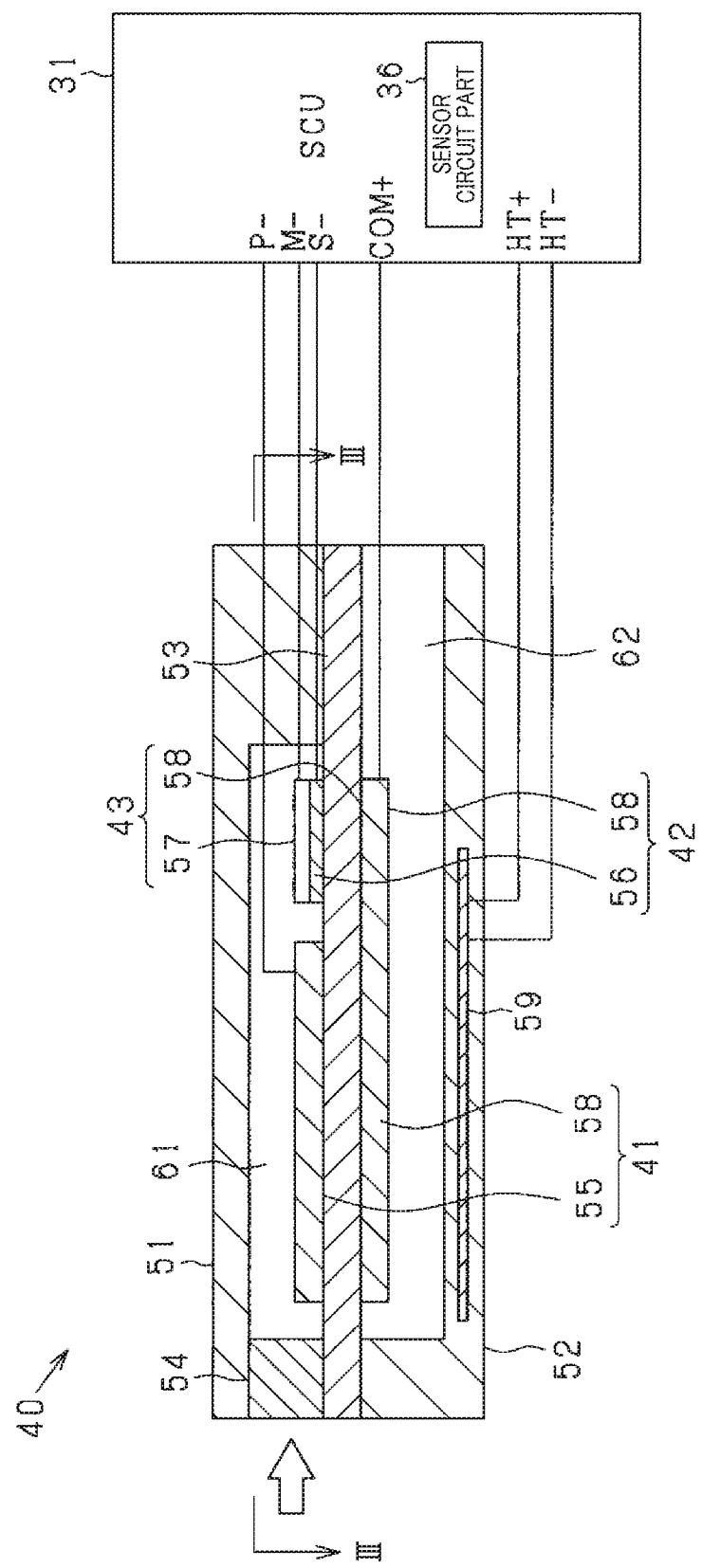
FIG. 2 is a view showing a relationship between the NOx sensor and the SCU in the engine exhaust system shown in FIG. 1.
Figure 3:
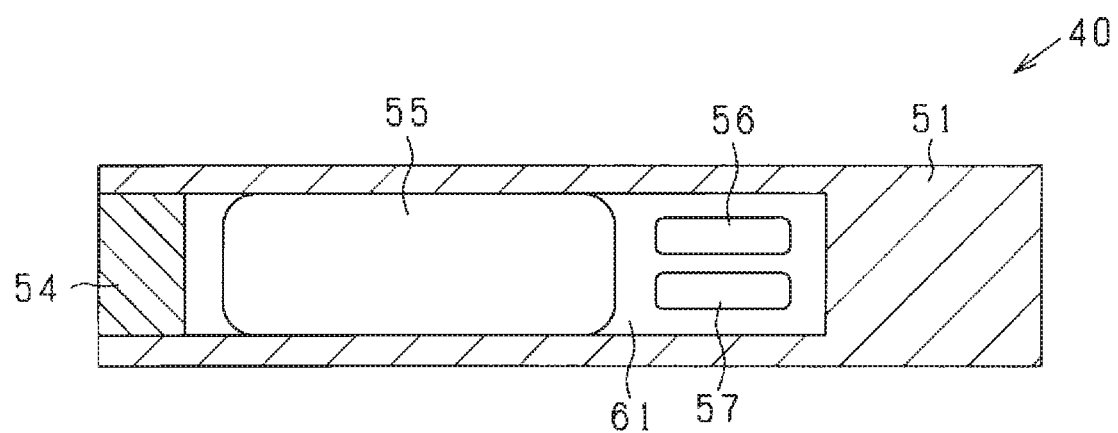
FIG. 3 is a view showing a cross section of the sensor element in the NOx sensor along the line III-III shown in FIG. 2.

FIG. 2 is a view showing a relationship between the NOx sensor and the SCU in the engine exhaust system shown in FIG. 1. FIG. 3 is a view showing a cross section of the sensor element in the NOx sensor along the line III-III shown in FIG. 2. That is, FIG. 2 and FIG. 3 show the structure of the sensor element 40 in the NOx sensor 21. In FIG. 2 and FIG. 3, the horizontal direction corresponds to the longitudinal direction of the sensor element 40. A front end side of the sensor element 40 is arranged at the left side in FIG. 2 and FIG. 3.

The sensor element 40 in the NOx sensor 21 has a three cell structure composed of a pump cell 41, a sensor cell 42 and a monitor cell 43. Like the pump cell 41, the monitor cell 43 discharges oxygen remaining in exhaust gas. The monitor cell 43 is referred to as an auxiliary pump or a secondary pump.

The sensor element 40 is composed of a first main part 51, a second main part 52, an electrolyte body 53 arranged between the first main part 51 and the first main part 52, a diffusion resistance body 54, a pump cell electrode 55, a sensor cell electrode 56, a monitor cell electrode 57, a common electrode 58 and a heater part 59. A gas chamber 61 is formed between the first main part 51 and the electrolyte body 53. An atmosphere chamber 62 is formed as a reference gas chamber between the second main part 52 and the electrolyte body 53.

The pump cell 41 has the function to adjust a concentration of oxygen contained in exhaust gas which has been introduced in the inside of the gas chamber 61. The pump cell 41 is composed of the pump cell electrode 55, the common electrode 58 and a part of the electrolyte body 53.

The sensor cell 42 has the function to detect a concentration of a specific gas component, for example, NOx contained in exhaust gas in the gas chamber 61 on the basis of an oxygen ion current flowing between the sensor cell electrode 56 and the common electrode 58.

The monitor cell 43 the function to detect a concentration of oxygen remaining in the gas chamber 61 on the basis of an oxygen ion current flowing between the monitor cell electrode 57 and the common electrode 58. The monitor cell 43 is composed of the monitor cell electrode 57, the common electrode 58 and a part of the electrolyte body 53.

The electrolyte body 53 has a plate shape and is made of oxygen ion conductive solid electrolyte material such as zirconia, etc.

The first main part 51, the electrolyte body 53 and the second main part 52 are stacked in order so that the electrolyte body 53 is sandwiched between the first main part 51 and the second main part 52. The first main part 51, the electrolyte body 53 and the second main part 52 form a lamination.

The first main part 51 has a step structure. Both sides of the first main part 51 project toward the electrolyte body 53 side so as to form the gas chamber 61. That is, the gas chamber 61 has a concave shape, i.e. the first main part 51 is depressed to form the gas chamber 61, as shown in FIG. 2.

As shown in FIG. 2, one end of the depressed part in the first main part 51 is open, into which the diffusion resistance body 54 is arranged and fitted. The diffusion resistance body 54 is made of a porous material having pores so as to adjust a moving speed of exhaust gas to be introduced into the inside of the gas chamber 61.

Similar to the structure of the first main part 51, the second main part 52 has a step structure to form the atmosphere chamber 62. One end of the atmosphere chamber 62 is open through which the gas introduced from the electrolyte body 53 side into the inside of the atmosphere chamber 62 is discharged to surrounding atmosphere of the NOx sensor.

As shown in FIG. 2, the pump cell electrode 55, the sensor cell electrode 56 and the monitor cell electrode 57 as a negative electrode side are formed on the surface of the electrolyte body 53, which faces the gas chamber 61 side. In this structure, the pump cell electrode 55 is arranged at the inlet part of the gas chamber 61 close to the diffusion resistance body 54 side, i.e. at the upstream side of the gas chamber 61. On the other hand, as shown in FIG. 2, the sensor cell electrode 56 and the monitor cell electrode 57 are arranged at the opposite end to the diffusion resistance body 54 with the pump cell electrode 55 between them, i.e. at the downstream side of the gas chamber 61.

The pump cell electrode 55 has a surface area which is larger than that of the sensor cell electrode 56 and the monitor cell electrode 57.

As shown in FIG. 2, the sensor cell electrode 56 and the monitor cell electrode 57 are arranged parallel to each other and parallel to the flow of exhaust gas in the gas chamber 61. Each of the sensor cell electrode 56 and the monitor cell electrode 57 is made of noble metal such as Au—Pt alloy which is inactive to NOx. That is, the sensor cell electrode 56 and the monitor cell electrode 57 substantially do not decompose NOx contained in exhaust gas. On the other hand, the sensor cell electrode 56 is made of noble metal such as platinum Pt, rhodium Rh, etc. which easily decomposes NOx.

The common electrode 58 is formed on the surface of the solid electrolyte body 53 which is exposed to the atmosphere chamber 62 so that the common electrode 58 corresponds in location to the pump cell electrode 55, the sensor cell electrode 56 and the monitor cell electrode 57, respectively.

When a voltage is supplied between the pump cell electrode 55 and the common electrode 58, oxygen remaining in the exhaust gas in the gas chamber 61 is converted to oxygen ions by the pump cell electrode 55 at the negative electrode side. The oxygen ions move to the common electrode 58 as the positive electrode side through the electrolyte body 53. The oxygen ions release electric charge on the common electrode 58 and are converted to oxygen. After this, oxygen is discharged into the atmosphere chamber 62. This process makes it possible to maintain a predetermined low oxygen concentration in the gas chamber 61.

The higher the voltage to be supplied to the pump cell 41 is (i.e. the higher the supply voltage to be supplied between the pump cell electrode 55 and the common electrode 58 is), the more the amount of oxygen to be discharged from exhaust gas by the pump cell 41 is increased. On the other hand, the lower the voltage to be supplied to the pump cell 41 is, the less the amount of oxygen to be discharged from exhaust gas by the pump cell 41 is reduced. Accordingly, it is possible to adjust the amount of oxygen remaining in exhaust gas, which flows in the sensor cell 42 and the monitor cell 43 by adjusting the supply voltage to the pump cell 41. The first exemplary embodiment will use a pump cell supply voltage Vp which is supplied to the pump cell 41, and uses a pump cell current Ip which flows a current in the pump cell 41 when the pump cell supply voltage Vp is supplied to the pump cell 41.

The monitor cell 43 detects the concentration of oxygen remaining in the gas chamber 61 from which the pump cell 41 has discharged oxygen. That is, the monitor cell 43 generates a current signal due to the voltage supplied to the pump cell 41 or due to the concentration of oxygen remaining in the gas chamber 61, and transmits the current signal to the SCUs 31 to 33. The SCUs 31 to 33 receive the current signal as a monitor cell current Inn and a monitor cell electromotive force Vm transmitted from the monitor cell 43.

After oxygen has been discharged from the pump cell 41, the sensor cell 42 reduces NOx contained in exhaust gas when the pump cell supply voltage Vp is supplied to the pump cell 41. At this time, each of the SCUs 31 to 33 receives a current signal as a sensor cell current Is transmitted from the sensor cell 42. The sensor cell current Is corresponds to a concentration of NOx in the gas chamber 61 and a current signal which corresponds to a concentration of oxygen remaining in the gas chamber 61. The SCUs 31 to 33 receive the sensor cell current Is transmitted from the sensor cell 42. The SCUs 31 to 33 calculate a concentration of NOx contained in exhaust gas in the gas chamber 61 on the basis of the sensor cell current Is.

As shown in FIG. 2, each of the SCUs 31 to 33 has a sensor circuit part 36 which is connected to the pump cell 41, 42, 43 in the corresponding NOx sensor 21, 22, 23. The sensor circuit part 36 is composed of a shunt resistance and an amplifier, etc. so as to detect the pump cell current Ip, the monitor cell current Im, the monitor cell electromotive force Vm and the sensor cell current Is.

There is a tendency in which the transient response characteristics of the sensor cell current Is in the sensor cell 42 are changed due to the deteriorated state after years of use even if a concentration of a specific detection target in exhaust gas does not change.

A description will now be given of the transient response characteristics of the sensor cell current Is as the output of the sensor cell 42 with reference to FIG. 4A, FIG. 4B and FIG. 4C.

FIG. 4A is the graph showing a time change of the pump cell supply voltage Vp, FIG. 4B is the graph showing a time change of the pump cell current Ip, and FIG. 4C is the graph showing a time change of the transient response characteristics of the sensor cell current Is as the output of the sensor cell 42 in the sensor element 40 in each NOx sensor due to deteriorated state after years of use.

In a first voltage switching process, the pump cell supply voltage Vp is switched to increase a concentration of oxygen remaining in the gas chamber 61. On the other hand, in a second voltage switching process, the pump cell supply voltage Vp is switched to reduce the concentration of remaining in the gas chamber 61.

A description will now be given of the first voltage switching process and the second voltage switching process with reference to FIG. 4A to FIG. 4C.

As shown in FIGS. 4A, 4B and 4C, at timing t1, the first voltage switching process switches the pump cell supply voltage Vp stepwise from an initial pump cell supply voltage Vp0 to a first pump cell supply voltage Vp1 (Vp0>Vp1). That is, the first voltage switching process switches the pump cell supply voltage Vp stepwise so as to reduce the pump cell current Ip and to increase a concentration of oxygen in the gas chamber 61. In the first voltage switching process, as shown in FIG. 4B, the pump cell current Ip changes along a tailing slope from an initial pump cell current Ip0. The pump cell current Ip finally converges to a first pump cell current Ip1. In the pump cell 42, the sensor cell current Is increases to its steady-state value in accompaniment with increasing of the concentration of oxygen remaining in the gas chamber 61 through its transient response state.

FIG. 4C shows the time change of the transient response characteristics of the sensor cell current Is as the output of the sensor cell 42 in accompaniment with the reduction of the pump cell supply voltage Vp. In more detail, in FIG. 4C, the solid line shows the initial state of the transient response characteristics of the sensor cell current Is at the time of manufacturing NOx sensor. The long and short dash line represents the deteriorated state of the transient response characteristics of the sensor cell current Is after the NOx sensor has deteriorated due to a long passage of time.

That is, FIG. 4C shows an actual state in which a difference is generated in the transient response characteristics of the sensor cell current Is between the initial state and the deteriorated state due to use over a long time even through the exhaust gas introduced into the sensor cell 42 has a constant concentration.

A NOx sensor has a tendency in which the steady-state value of the sensor cell current Is in the deteriorated state is lower than that in the initial state. Further, a rising of the sensor cell current Is in the deteriorated state is delayer rather than that in the initial state. For example, during the transient period Ta shown in FIG. 4C, the slope A11 of the transient response characteristics of the sensor cell current Is in the deteriorated state (i.e. the slope A11 in the deteriorated state) is a gentle slope when compared with the slope A10 of the transient response characteristics of the sensor cell current Is at the initial state (i.e. the slope A10 at the initial state).

The transient period Ta is counted from the start point P1 at which the switching of the pump cell supply voltage Vp is initiated to the end point P2 at which the voltage switching process of the pump cell supply voltage Vp is finished. These tendencies of the difference are remarkably shown according to the deteriorated state progresses.

As shown in FIG. 4A, FIG. 4B and FIG. 4C, at timing t2, the second voltage switching process switches the pump cell supply voltage Vp stepwise from the first pump cell supply voltage Vp1 to a second pump cell supply voltage Vp2 (Vp1<Vp2). The second voltage switching process switches the pump cell supply voltage Vp stepwise so as to increase the pump cell current Ip and to reduce the concentration of oxygen remaining in the gas chamber 61. In the second voltage switching process, the pump cell current Ip changes along a tailing slope from the first pump cell current Ip1, and finally converges to a second pump cell current Ip2. The pump cell 42 reduces the sensor cell current Is to the steady-state value after the transient response state according to reduction of the concentration of oxygen remaining in the gas chamber 61. During the second voltage switching process, a difference is generated in the transient response characteristics of the sensor cell current Is between the initial state and the deteriorated state due to use of a long term even through the exhaust gas introduced into the sensor cell 42 has the constant concentration. When considering the slope of the transient characteristics during the period Tb in the transient response state, the slope A21 of the transient characteristics in the deteriorated state is gentler than the slope A20 of the transient characteristics in the initial state. In FIG. 4C, the period Tb is counted from the start point P3 to the end point P4 in the transient response state caused by the switching of the pump cell supply voltage Vp.

In the first voltage switching process, the start point P1 and the end point P2 shown in FIG. 4C are determined after the pump cell supply voltage Vp is switched and before the sensor cell current Is becomes stable.

Figure 5:
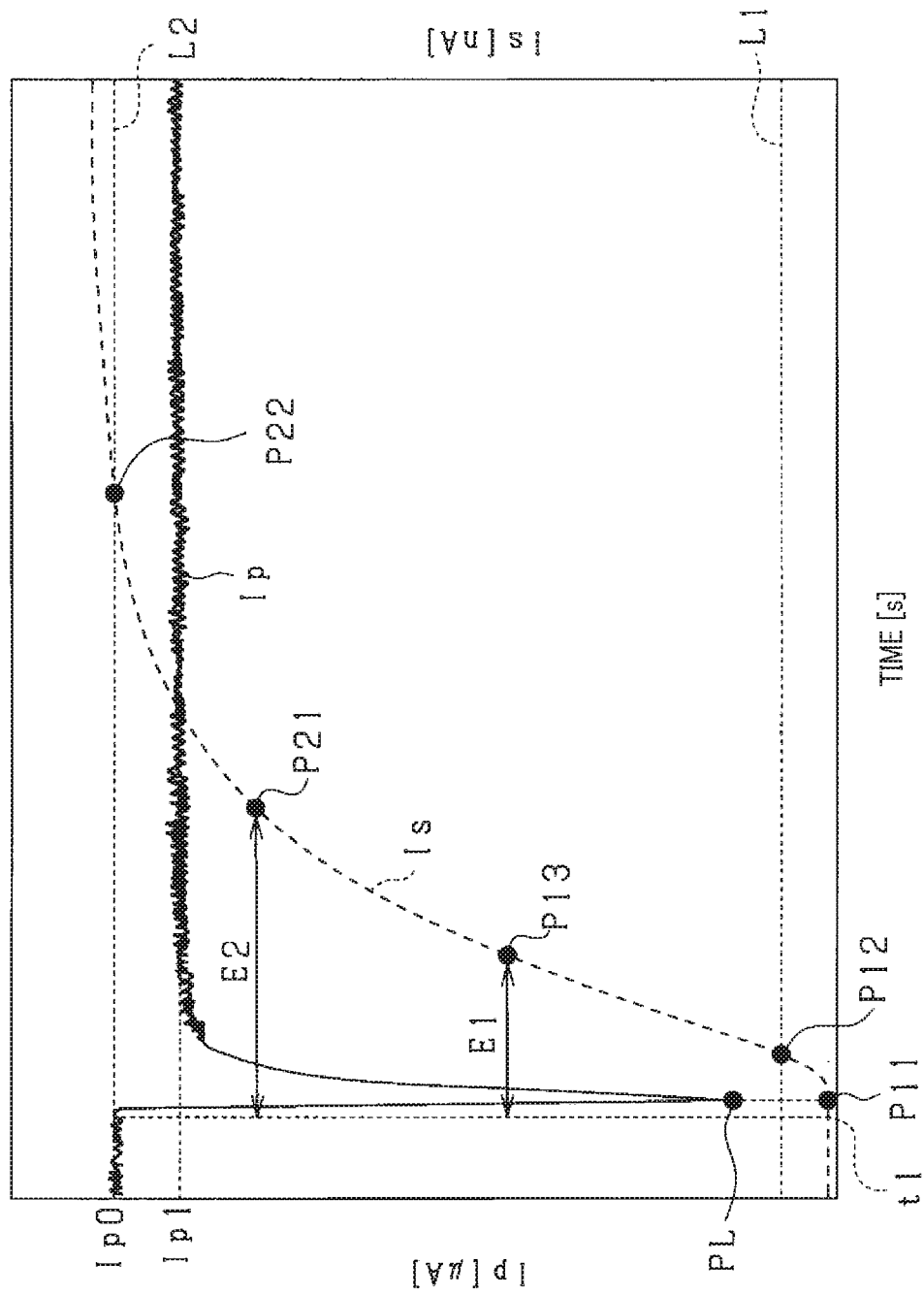
FIG. 5 is a graph showing a start point and an end point to be used for calculating slope parameters used by the gas sensor control device shown in FIG. 1.

A description will now be given of the timing when the start point P1 is determined and the timing when the end point P2 is determined with reference to FIG. 5. FIG. 5 is a graph showing the start point P1 and the end point P2 to be used for calculating the slope parameters used by the gas sensor control device shown in FIG. 1.

The SCU determines, as the start point P1 shown in FIG. 4C, one of the following three points P11 in (a1.), P12 in (a2) and P13 in (a3) shown in FIG. 5:

(a1) the point P11 shown in FIG. 5 when the tailing slope of the pump cell current Ip reaches the lowermost point PL caused by the voltage switching process of the pump cell supply voltage Vp;

(a2) the point P12 shown in FIG. 5 when the change amount of the output sensor current Is of the sensor cell 42, caused by the voltage switching process of the pump cell supply voltage Vp, reaches a first predetermined value L1; and (a3) the point P13 shown in FIG. 5 when a predetermined period E1 of time has elapsed counted from the timing after the voltage switching process of the pump cell supply voltage Vp.

In addition, the SCU determines, as the end point P2 shown in FIG. 4C, one of the point P21 in (a4) and the point P22 in (a5) shown in FIG. 5:

(a4) the point P21 shown in FIG. 5 when a predetermined period E2 of time has elapsed counted from the timing after the voltage switching process of the pump cell supply voltage Vp; and (a5) the point P22 shown in FIG. 5 when the change amount of the output sensor current Is of the sensor cell 42 caused by the voltage switching process of the pump cell supply voltage Vp reaches a second predetermined value L2.

The first predetermined value L1 is calculated by multiplying a predetermined percentage (for example, a value within a range of 5% to 30%) and the pump cell current Ip before the switching of the pump cell supply voltage Vp. In this case, the change amount of the sensor cell current Is becomes 100% when the pump cell supply voltage Vp is switched from the initial pump cell supply voltage Vp0 to the first pump cell supply voltage Vp1 under the initial condition of each of the NOx sensors 21 to 23.

Further, the second predetermined value L2 is larger than the first predetermined value L1, and is calculated by multiplying a predetermined percentage (for example, a value within a range of 50% to 95%) and the pump cell current Ip before the change of the pump cell supply voltage Vp.

In order to perform early the deteriorated state detection process of the sensor cell 42, it is preferable to determine the start point P1 and the end point P2 as early as possible. For example, it is preferable to use the case (a1) as the start point P1 and to use the case (a4) as the end point P2.

In the second voltage switching process, the start point P3 and the end point P4 shown in FIG. 4C are determined after the pump cell supply voltage Vp is switched and before the sensor cell current Is becomes stable.

A description will now be given of the timing when the start point P3 is determined and the timing when the end point P4 is determined with reference to FIG. 5.

Because the determination process for the start point P3 and the end point P4 is similar to the determination process for the start point P1 and the end point P2, only a description will be given of determining the start point P3 and the end point P4 as follows.

For example, the SCU determines, as the start point P3 shown in FIG. 4C, one of the following three points:
(b1) the point when the tailing slope of the pump cell current Ip, caused by the voltage switching process of the pump cell supply voltage Vp, reaches an lowermost point;
(b2) the point when the change amount of the output sensor current Is of the sensor cell 42, caused by the voltage switching process of the pump cell supply voltage Vp, reaches a third predetermined value; and
(b3) the point when a predetermined period of time has elapsed after the voltage switching process of the pump cell supply voltage Vp.

In addition, the SCU determines, as the end point P4 shown in FIG. 4C, one of the following points:
(b4) the point when a predetermined period of time has elapsed counted from the timing after the voltage switching process of the pump cell supply voltage Vp; and
(b5) the point when the change amount of the output sensor current Is of the sensor cell 42, caused by the voltage switching process of the pump cell supply voltage Vp, reaches a fourth predetermined value.

Similar to the first predetermined value L1 in (a2) and the second predetermined value L2 in (a5) previously described, it is preferable to determine the third predetermined value in (b2) and the fourth predetermined value in (b5) so that the third predetermined value is larger than the fourth predetermined value on the basis of a predetermined percentage of the current changed amount of the sensor cell current Is when the pump cell supply voltage Vp has been switched in the initial state of each of the NOx sensors 21 to 23.

It can be considered that each of the initial pump cell supply voltage Vp0 and the initial pump cell current Ip0 before the first voltage switching process has an optional value, i.e. depends on a concentration of oxygen remaining in exhaust gas remaining in the gas chamber 61 before execution of the first voltage switching process.

When the concentration of oxygen remaining in exhaust gas in the gas chamber 61 is high, a change amount ΔIp (see FIG. 4B) of the pump cell current Ip significantly increases due to the first voltage switching process. This causes negatively influences to the deteriorated state detection process of the sensor cell 42 which is performed on the basis of the change amount of the sensor cell current Is. When the change amount ΔIp (see FIG. 4B) of the pump cell current Ip becomes a significantly large value, because the significantly large change amount of the sensor cell current Is overshoots its allowable value, this reduces the detection accuracy of the sensor cell current Is.

Furthermore, the voltage switching process from the first pump cell supply voltage Vp1 to the second pump cell supply voltage Vp2 generates unintended change of the pump cell current Ip during the voltage supplying period of the first pump cell supply voltage Vp1. In this case, the detection accuracy of the sensor cell current Is may be reduced due to an excessive value of the change amount ΔIp (see FIG. 4B) of the pump cell current Ip.

In order to avoid the drawback previously described, each of the SCUs 31 to 33 and the engine ECU 35 as the gas sensor control device according to the first exemplary embodiment adjusts the change amount ΔIp of the pump cell current Ip as the variation range of the pump cell current Ip, before and after the execution of the voltage switching process of the pump cell supply voltage Vp, to be within a predetermined variation range.

Figure 6:
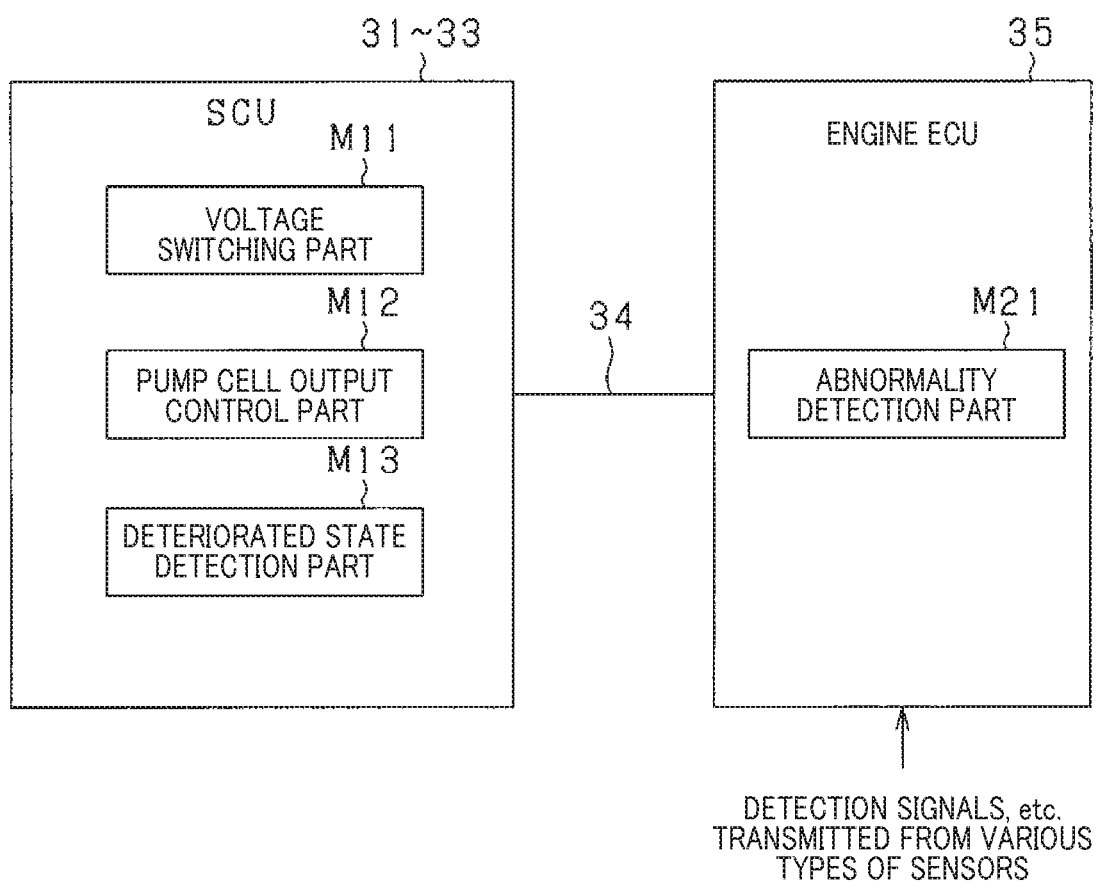
FIG. 6 is a block diagram showing the function of each of the SCUs and the engine ECU as the gas sensor control device according to the first exemplary embodiment of the present invention.

FIG. 6 is a block diagram showing the function of each of the SCUs 31 to 33 and the engine ECU 35 as the gas sensor control device according to the first exemplary embodiment of the present invention.

As shown in FIG. 6, the SCU has a voltage switching part M11, a pump cell output control part M12 and a deteriorated state detection part M13.

The voltage switching part M11 switches the pump cell supply voltage Vp to a predetermined voltage value. The pump cell output control part M12 adjusts the change amount ΔIp of the pump cell current Ip as the variation range of the pump cell current Ip, before and after the execution of the switching process of the pump cell supply voltage Vp, to be within the predetermined variation range. The deteriorated state detection part M13 in the SCU detects a deteriorated state of the sensor cell 42 on the basis of the change amount ΔIs of the sensor cell current Is in accompaniment with the voltage switching process of the pump cell supply voltage Vp performed by the voltage switching part M11.

The voltage switching part M11 in the SCU performs the first voltage switching process (from the initial pump cell supply voltage Vp0 to the first pump cell supply voltage Vp1 shown in FIG. 4A) and the second voltage switching process (from the first pump cell supply voltage Vp1 to the second pump cell supply voltage Vp2 shown in FIG. 4A).

In the first voltage switching process, the voltage switching part M11 switches the pump cell supply voltage Vp so as to increase the concentration of oxygen in exhaust gas as the detection target gas remaining in the gas chamber 61. On the other hand, in the second voltage switching process, the voltage switching part M11 switches the pump cell supply voltage Vp so as to reduce the concentration of oxygen in exhaust gas as the detection target gas remaining in the gas chamber 61. That is, the voltage switching part M11 performs a voltage switching cycle for reducing the pump cell supply voltage Vp and then for increasing the pump cell supply voltage Vp.

In each SCU as the gas sensor control device according to the first exemplary embodiment, the voltage switching part M11 switches the pump cell supply voltage Vp in a square waveform. However, the concept of the present invention is not limited by the first exemplary embodiment. It is acceptable for the voltage switching part M11 to change the pump cell supply voltage Vp in another waveform other than the square waveform. In this case, because the deteriorated state detection of the sensor cell 42 is performed on the basis of the comparison results between the initial state and the detection state, it is preferable to use the same waveform of the pump cell supply voltage Vp between the initial state and the deteriorated state detection state.

The pump cell output control part M12 in the SCU determines the pump cell supply voltage Vp after the voltage switching process of the pump cell supply voltage Vp (i.e. the post-switching voltage) on the basis of the pump cell current Ip detected before the voltage switching process of the pump cell supply voltage Vp. This function of the pump cell output control part M12 corresponds to a voltage setting part. This control performed by the pump cell output control part M12 as the voltage setting part can optimize the pump cell supply voltage Vp after the voltage switching process (i.e. the post-switching voltage) even if the pump cell current Ip before the voltage switching process of the pump cell supply voltage Vp has an any current value.

Specifically, in a case in which the first voltage switching process switches the pump cell supply voltage Vp to the first pump cell supply voltage Vp1, when the initial pump cell current Ip0 before execution of the first voltage switching process is larger than the predetermined current value, the pump cell output control part M12 increases the first pump cell supply voltage Vp1 as the post-switching voltage to be more than that when the initial pump cell current Ip0 is smaller than the predetermined current value.

That is, when the initial pump cell current Ip0 has a significantly large current value, the change range of the pump cell current Ip becomes significantly large, the pump cell output control part M12 adjusts the first pump cell supply voltage Vp1 so as to limit the switching range of the pump cell supply voltage Vp.

The pump cell output control part M12 prohibits the execution of the voltage switching process when the initial pump cell current Ip0, before the first voltage switching process switching to the first pump cell supply voltage Vp1, is smaller than a predetermined switching permission current value.

The state, in which the initial pump cell current Ip0 before the voltage switching process switching to the first pump cell supply voltage Vp1 is smaller than the predetermined current value, represents that the exhaust gas has a low concentration of oxygen which is lower than a predetermined concentration of oxygen in the gas chamber 61, in other words, this represents that there is a possible case in which the concentration of oxygen in the gas chamber 61 may not change by the pump cell switching process switches the pump cell supply voltage Vp so as to increase the concentration of oxygen in the exhaust gas remaining in the gas chamber 61.

In a case in which the pump cell output control part M12 performs the second voltage switching process switching from the first pump cell supply voltage Vp1 to the second pump cell supply voltage Vp2, when the first pump cell current Ip1 detected before the second voltage switching process is smaller than the predetermined current value, the pump cell output control part M12 reduces the second pump cell supply voltage Vp2 after the second voltage switching process less than the that when the first pump cell current Ip1 is greater than the predetermined current value.

Because the first pump cell current Ip1 is a significantly small value, the change range of the pump cell current Ip, in accompaniment with the voltage switching process, becomes an extremely large value. Accordingly, the pump cell output control part M12 adjusts the second pump cell supply voltage Vp2 so as to limit the switching range of the pump cell supply voltage Vp.

Further, the pump cell output control part M12 prohibits the execution of the voltage switching process when the first pump cell current Ip1 detected before the pump cell supply process switching to the second pump cell supply voltage Vp2 is greater than the predetermined switching permission current value. The condition, in which the first pump cell current Ip1 is greater than the predetermined switching permission current value, represents a possible case in which the intended change of the concentration of oxygen in the gas chamber 61 is hardly generated when the pump cell supply voltage Vp is changed so as to reduce the concentration of oxygen in the gas chamber 61.

In the deteriorated state detection process, the deteriorated state detection part M13 calculates a deteriorated state ratio C of the sensor cell 42, i.e. the deteriorated state of the sensor cell 42 on the basis of a gradient slope of the sensor cell current Is during the transient change of the sensor cell current Is in accompaniment with the voltage switching process of the pump cell supply voltage Vp performed by the voltage switching part M11.

In other words, the deteriorated state detection part M13 detects the deteriorated state, i.e. the deteriorated state ratio C of the sensor cell 42 on the basis of the change amount $\Delta Is$ of the sensor cell current Is in accompaniment with the voltage switching process of the pump cell supply voltage Vp performed by the voltage switching part M11.

Each of the SCUs 31 to 33 as the gas sensor control device according to the first exemplary embodiment uses a transient change slope $\Delta s/\Delta t$ as the slope parameter of the sensor cell Is, where $\Delta s$ is a current change amount, and $\Delta t$ represents a unit time.

In particular, in the voltage switching cycle, the deteriorated state detection part M13 detects the deteriorated state of the sensor cell 42 on the basis of a first sensor cell current change amount and a second sensor cell current change amount.

The first sensor cell current change amount is a current change amount of the sensor cell current Is when the first voltage switching process is performed. The second sensor cell current change amount is a current change amount when the second voltage switching process is performed.

The sensor cell 42 detects the sensor cell current Is of nano ampere (nA) order during the normal NOx concentration detection, and detects the sensor cell current Is of a micro ampere (μA) order when the voltage switching process of the pump cell supply voltage Vp during the deteriorated state detection process. In the both detection modes, it is preferable to switch the range of the current in the A/D conversion performed by the SCUs 31 to 33 in order to enhance the detection accuracy of the sensor cell current Is. It is preferable to expand the current range in the deteriorated state detection more than the current range during the NOx concentration detection.

The engine ECU 35, which also corresponds to the gas sensor control device according to the present invention, has an abnormality detection part M21 capable of detecting an engine failure such as the abnormality state of the engine emission or the emission deterioration of the engine on the basis the deteriorated state detection results performed by each of the SCUs 31 to 33. In more detail, the abnormality detection part M21 detects occurrence of emission abnormality of the engine on the basis of the deteriorated state, i.e. the deteriorated state ratio C of the sensor cell 42 calculated by the deteriorated state detection part M13 in each of the SCUs 31 to 33.

It is acceptable for the abnormality detection part M21 to detect occurrence of the emission abnormality on the basis of overall information and data such as the output of the NOx sensors 21 to 23, sensor information transmitted from other sensors, and the operation state of the diesel engine 10, etc.

It is acceptable for the SCU sensors 31 to 33 to perform both the detection of deterioration of the sensor cell 42 and the detection of emission abnormality of the diesel engine 10. It is also acceptable for the engine ECU 35 to perform both the detection of deterioration of the sensor cell 42 and the detection of emission abnormality of the diesel engine 10. That is, each of the SCUs 31 to 33 and the engine ECU 35 may correspond to the gas sensor control device according to the first exemplary embodiment.

It is preferable for the engine ECU 35 to detect the emission abnormality of the diesel engine 10 because it is preferable to perform the detection of the emission abnormality on the basis of the deteriorated state information of the NOx sensors 21 to 23.

A description will now be given of the detection process of a deteriorated state of the sensor cell 42 with reference to the flow chart shown in FIG. 7.

Figure 7:
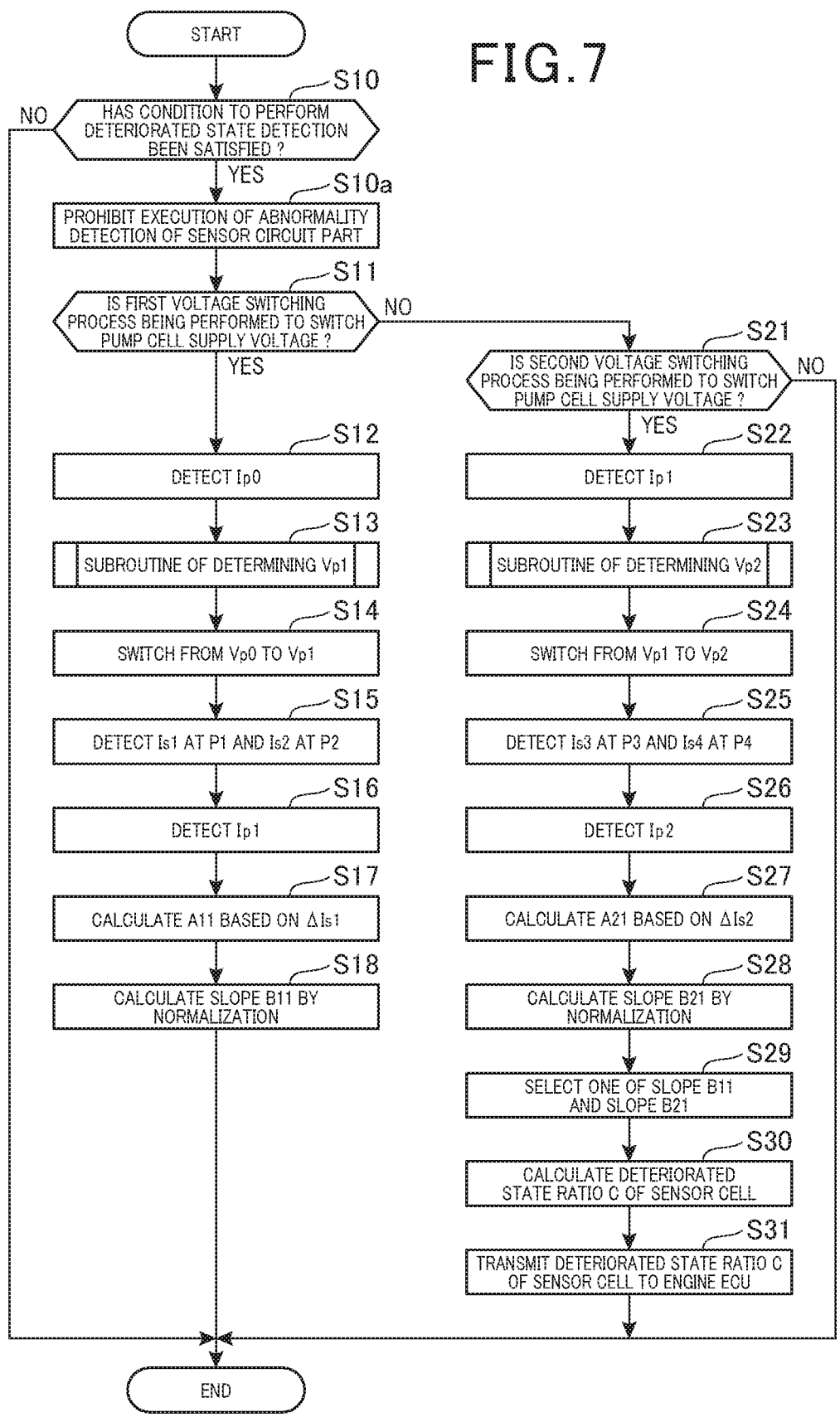
FIG. 7 is a flow chart showing a deteriorated state detection process of the sensor cell performed by the gas sensor control device according to the first exemplary embodiment of the present invention shown in FIG. 1.

FIG. 7 is a flow chart showing a deteriorated state detection process of the sensor cell performed by the gas sensor control device according to the first exemplary embodiment of the present invention shown in FIG. 1.

Each of the SCUs 31 to 33 performs the deteriorated state detection process shown in FIG. 7 every predetermined period, for example.

In step S10 shown in FIG. 7, the SCU detects whether the condition to perform the deteriorated state detection has been satisfied. In the first exemplary embodiment, this condition indicates that the SCU has received a permission signal transmitted from the engine ECU 35. The permission signal allows the execution of the deteriorated state detection of the sensor cell 42.

When the exhaust gas pipe 11 is in a stably gas environment, i.e. when the gas environment in the exhaust gas pipe 11 is in a stable state in which a each of a change amount per unit time of a concentration of oxygen and a change amount per unit time of a concentration of NOx contained in exhaust gas in the gas chamber 61 is a stable value which is not more than a predetermined concentration change amount value, the engine ECU 35 generates and transmits the permission signal to each of the SCUs 31 to 33. Specifically, when the diesel engine 10 operates under a predetermined operating state and an amount of exhaust gas emitted from the diesel engine 10 is relatively stable, or when a fuel cut process is performed for the diesel engine 10, or when it is a timing immediately after the ignition switch is turned off (IG turned-off state), or when the engine ECU 35 is started by a soak timer. For example, such a soak timer counts a soak timer value while a power switch on a vehicle is in a turned-off state and turns on a power switch every fixed interval based on the soak timer value so as to activate a control operation of the vehicle.

It is preferable for the engine ECU 30 to generate and transmit the permission signal to each of the SCUs 31 to 33 immediately after the ignition switch is turned off. Because the flow of exhaust gas becomes reduced immediately after the ignition switch is turned off and the engine stops operating, it is possible to perform the deteriorated state detection process of detecting a deteriorated state of the sensor cell 42 which is placed under the stable gas atmosphere environment.

When the detection result in step S10 indicates affirmation ("YES" in step S10), i.e. indicates that the condition to perform the deteriorated state detection has been satisfied, the operation flow progresses to step S10*a*.

On the other hand, when the detection result in step S10 indicates negation ("NO" in step S10), i.e. indicates that the condition to perform the deteriorated state detection has not been satisfied, the SCU finishes the deteriorated state detection process shown in FIG. 7.

In step S10*a*, the SCU prohibits the execution of the abnormality detection of the sensor circuit part 36. That is, each of the SCUs 31 to 33 executes the abnormality diagnosis of the sensor circuit part 36. For example, the SCU performs the abnormality detection, i.e. detects occurrence of a disconnection or a short circuit in each of the pump cell 41, the sensor cell 42, the monitor cell 43 and the heater part 59.

The accuracy of the abnormality detection may be reduced due to the execution of the voltage switching process to switch the pump cell supply voltage Vp. Accordingly, each of the SCUs 31 to 33 prohibits execution of the abnormality diagnosis before the following voltage switching process. That is, the SCUs 31 to 33 correspond to the diagnosis prohibition part having the function of prohibiting the sensor circuit part 36 from performing the abnormality detection before the voltage switching process of the pump cell supply voltage Vp.

That is, it is preferable for each of the SCUs 31 to 33 to prohibit:

(1) the sensor circuit part 36 from performing the overall abnormality detection processes;

(2) the sensor circuit part 36 from performing the abnormality detection processes excepting for the abnormality detection process of the heater part 59; or (3) the sensor circuit part 36 from performing the abnormality detection process of the sensor cell 42 only, or from performing the abnormality detection processes of the sensor cell 42 and the monitor cell 43.

It is preferable to release the prohibition of performing the abnormality detection process at a timing when the second voltage switching process is finished. In more detail, it is preferable to release the prohibition of performing the abnormality detection process at a timing when the predetermined period of time has been elapsed counted from the time when the second voltage switching process is finished.

It is acceptable to maintain the prohibition of performing the abnormality detection process until a timing when the power source is turned off after the ignition switch has been turned off.

It is acceptable for each of the SCUs 31 to 33 to eliminate the abnormality detection results of the sensor circuit part 36 as the prohibition of the abnormality detection. The operation flow progresses to step S11.

In step S11, each of the SCUs 31 to 33 detects whether the first voltage switching process is performed to switch the pump cell supply voltage Vp and to increase a concentration of oxygen remaining in the gas chamber 61. At this time, each of the SCUs 31 to 33 detects whether each of a change amount per unit time of a concentration of oxygen and a change amount per unit time of a concentration of NOx contained in exhaust gas in the gas chamber 61 is a stable value which is not more than a predetermined concentration change amount value.

When the detection result indicates that the change amount of them is a stable value, each of the SCUs 31 to 33 allows the execution of the first voltage switching process. Specifically, each of the SCUs 31 to 33 detects whether the change amount of the pump cell current Ip per unit time is not more than a predetermined pump cell current change amount value before the execution of the first voltage switching process. Further, each of the SCUs 31 to 33 detects whether the change amount of the sensor cell current Is per unit time is not more than a predetermined sensor cell current change amount value before the execution of the first voltage switching process. If both the detection results indicate the stable state ("YES" in step S11), i.e. those results are not more than the predetermined pump cell current change amount value and the predetermined sensor cell current change amount value, respectively, the operation flow progress to step S12. It is acceptable for each of the SCUs 31 to 33 to prohibit the execution of step S11.

It is acceptable for each of the SCUs 31 to 33 to detect whether the change amount per unit time of one of the concentration of oxygen and the concentration of NOx in exhaust gas is not more than the corresponding change amount value, i.e. to detent whether it is in a stable state. In this case, when the concentration of oxygen contained in exhaust gas is in the stable state, or the concentration of NOx contained in exhaust gas is a the stable state, each of the SCUs 31 to 33 permits the execution of the first voltage switching process.

It is acceptable to detect whether the concentration of oxygen in exhaust gas is in the stable state on the basis of the detection result of the A/F sensor when the A/F sensor is mounted on the exhaust gas pipe 11.

It is acceptable for each of the SCUs 31 to 33 to permit the execution of the first voltage switching process when the concentration of oxygen contained in exhaust gas is within a predetermined oxygen concentration range or the concentration of NOx contained in exhaust gas is within a predetermined NOx concentration range. Further, it is preferable for each of the SCUs 31 to 33 to detect whether the concentration of oxygen and the concentration of NOx are within the predetermined concentration range, instead of detecting, or in addition to detecting whether the concentration of oxygen and the concentration of NOx are in the stable state.

In step S11, in addition to the detection previously described, it is acceptable for each of the SCUs 31 to 33 to permit the execution of the first voltage switching process when there is no failure history (no dialogue information) regarding the exhaust gas system, or when the voltage of the power source (i.e. the battery voltage) is not less than a predetermined voltage value. When the voltage of the power source is less than the predetermined voltage value, no adequate amount of the electric power is supplied to the heater part 59 in the sensor element 40 in the NOx sensor 21. This may it possible to reduce the accuracy of the deteriorated state detection process. The operation flow progresses to step S12.

In step S12, when performing the first voltage switching process, each of the SCUs 31 to 33 detects the initial pump cell current Ip0 as the pump cell output under the state in which the pump cell supply voltage Vp is the initial pump cell supply voltage Vp0 before the pump cell supply voltage Vp is switched to the first pump cell supply voltage Vp1. The operation flow progresses to step S13.

In step S13, the SCU performs a subroutine to determine the first pump cell supply voltage Vp1 after the first voltage switching process on the basis of the initial pump cell current Ip0.

A description will now be given of the determination process of the first pump cell supply voltage Vp1 with reference to the flow chart shown in FIG. 8A.

Figure 8A:
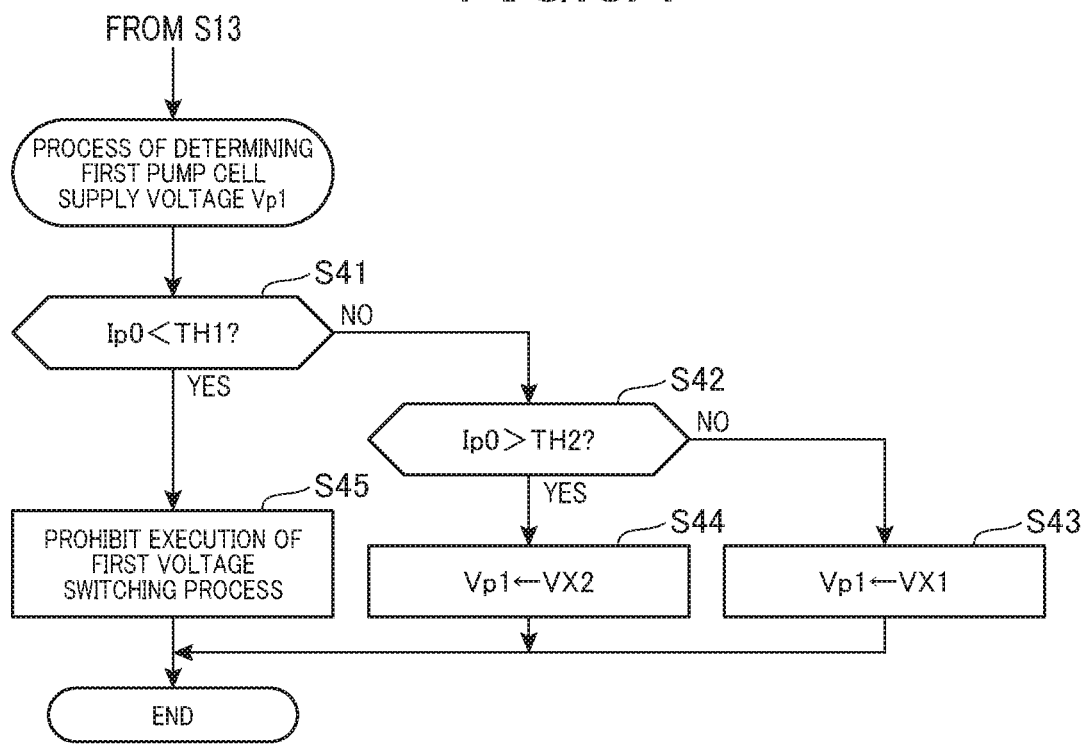
FIG. 8A is a flow chart showing a subroutine of determining a first pump cell supply voltage.

FIG. 8A is a flow chart showing the subroutine of determining the first pump cell supply voltage Vp1.

In step S13 shown in FIG. 7 and FIG. 8A, in order to adjust the variation range of the pump cell current Ip, before and after the execution of the first voltage switching process, to be within a predetermined variation range, each of the SCUs 31 to 33 detects whether the pump cell current Ip0 before the first voltage switching process is within a range from a threshold TH1 to a threshold value TH2. In step S13, each of the SCUs 31 to 33 determines the first pump cell supply voltage Vp1, as the pump cell supply voltage after the first voltage switching process, on the basis of the detection result, i.e. whether the pump cell current Ip0 before the first voltage switching process is within the range from the threshold TH1 to the threshold value TH2. There is a relationship between TH1<TH2.

In step S41 shown in FIG. 8A, the SCU detects whether the pump cell current Ip0 is less than the threshold value TH1. When the detection result in step S41 indicates that the pump cell current Ip0 is not less than the threshold value TH1 ("NO" in step S41), the operation flow progresses to step S42.

In step S42, the SCU detects whether the pump cell current Ip0 is more than the threshold value TH2.

When the detection result in step S42 indicates that the pump cell current Ip0 is not more than the threshold value TH2 ("NO" in step S42), i.e. indicates that the pump cell current Ip0 is within the range from TH1 to TH2, the operation flow progresses to step S43.

In step S43, the SCU selects a predetermined voltage VX1 as the first pump cell supply voltage Vp1.

When the pump cell current Ip0 is more than TH2 (Ip0>TH2, "YES" in step S42), the operation flow progresses to step S44. In step S44, the SCU selects a predetermined voltage VX2, which is higher than TH1, as the first pump cell supply voltage Vp1.

When pump cell current Ip0 is more than TH2 (Ip0>TH2), it can be considered that the initial pump cell supply voltage Vp0 is an increased value before the execution of the first voltage switching process. In this case, the use of the predetermined voltage VX2 as the first pump cell supply voltage Vp1 limits the switching range of the pump cell supply voltage Vp.

In step S41, when Ip0<TH1 (i.e. "YES" in step S41), the operation flow progresses to step S45.

In step S45, the SCU prohibits the execution of the first voltage switching process because the pump cell current Ip, i.e. the initial pump cell current Ip0, is less than the predetermined switching permission current value. That is, TH1 corresponds to the predetermined switching permission current value.

When the switching process of the pump cell supply voltage Vp is prohibited, the execution of the processes in step S14 to step S18 shown in FIG. 7 is temporarily prohibited.

Figure 8B:
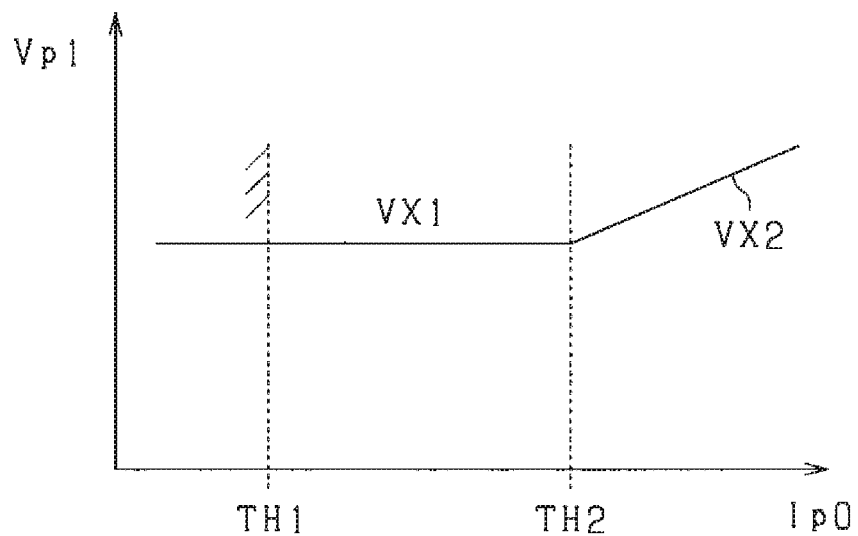
FIG. 8B is a graph showing a relationship between an initial pump cell current and the first pump cell supply voltage.

FIG. 8B is a graph showing a relationship between the initial pump cell current Ip0 and the first pump cell supply voltage Vp1. The predetermined voltage VX1 and the predetermined voltage VX2 previously described have the relationship shown in FIG. 8B.

When Ip0>TH2, the larger the initial pump cell current Ip0 is, the higher the first pump cell supply voltage Vp1 after the first voltage switching process is determined. When the relationship of VX1<VX2 is satisfied, it is possible to use a constant voltage value as the predetermined voltage VX2.

In the timing charts shown in FIG. 4A to FIG. 4C, the larger the initial pump cell current Ip0 is, before and after the voltage switching process, the larger the change amount ΔIp of the pump cell current Ip is. For this reason, the change amount of the output sensor current Is becomes large due to an excessive current change amount ΔIp of the pump cell current Ip, and this reduces the detection accuracy of the deteriorated state. Because the first exemplary embodiment determines the first pump cell supply voltage Vp1 as previously described, it is possible to optimize the change amount of the pump cell current Ip.

When the initial pump cell current Ip0 before the first voltage switching process is an excessively small value (which is smaller than the predetermined switching permission current value), the exhaust gas has a low concentration of oxygen. Because a necessary change of the concentration of oxygen in the gas chamber 61 is not generated, this reduces the accuracy of the deteriorated state detection. On the other hand, because the SCU according to the first exemplary embodiment prohibits the execution of the first voltage switching process of the pump cell supply voltage Vp when Ip0<TH1, it is possible to correctly change the concentration of oxygen in the gas chamber 61.

In step S14 shown in FIG. 7, the SCU switches the pump cell supply voltage Vp from the initial pump cell supply voltage Vp0 to the first pump cell supply voltage Vp1 at timing t1 shown in FIG. 4A. The operation flow progresses to step S15.

In step S15, the SCU detects a sensor cell current Is1 at the start point P1 and a sensor cell current Is2 at the end point P2 in the first voltage switching process. The operation flow progresses to step S16.

In step S16, the SCU detects the pump cell current Ip1 as the output of the pump cell 42 after the pump cell supply voltage Vp is switched to the first pump cell supply voltage Vp1 from the initial pump cell supply voltage Vp0. The first pump cell current Ip1 is detected at the timing at which the pump cell current Ip becomes stable, after the elapse of the predetermined period counted from the timing t1 when the first voltage switching process is performed. It is acceptable to detect the sensor cell currents Is1 and Is2, and the pump cell current Ip1 in any order. The operation flow progresses to step S17.

In step S17, the SCU calculates the slope A11 during the transient change of the sensor cell current Is by using the equation (1) on the basis of a first current change amount ΔIs1 (=Is2−Is1) and a time difference Δt1.

$$A11 = \Delta Is1/\Delta t1, \quad (2)$$

where the first current change amount ΔIs1 represents a difference between the sensor cell current Is1 at the start point P1 and the sensor cell current Is2 at the end point P2, and the time difference Δt1 is a period counted from a timing at the start point P1 to a timing at the end point P2. The first current change amount ΔIs1 corresponds to a first change amount. The slope A10 at the initial state shown in FIG. 4C can be calculated by using the equation (1). The operation flow progresses to step S18.

In step S18, the SCU normalizes the slope A11 to obtain a normalized slope B11. In the normalization process, the SCU calculates the normalized slope B11 by using the equation (2) on the basis of the slope A11 during the transient change of the sensor cell current Is and the change amount ΔIp1 (=Ip0−Ip1) of the pump cell current Ip due to the voltage switching process of the pump cell supply voltage Vp.

$$B11 = A11/\Delta Ip1, \quad (2).$$

In step S21, the SCU detects whether the second voltage switching process of the pump cell supply voltage Vp has been performed, so as to reduce the concentration of oxygen remaining in the gas chamber 61. When the detection result in step S21 indicates the permission of the execution of the second voltage switching process ("YES in step S21), the operation flow progresses to step S22.

In step S22, the SCu detects the pump cell current Ip1 as the output of the pump cell 42 when the pump cell supply voltage Vp is the first pump cell supply voltage Vp1 before the second voltage switching process. The second voltage switching process switches the first pump cell supply voltage Vp1 to the second pump cell supply voltage Vp2.

It is acceptable for the SCU to use the detection value obtained in step S16 instead of performing the process in step S22. The operation flow progresses to step S23.

In step S23, each of the SCUs 31 to 33 performs a subroutine to determine the second pump cell supply voltage Vp2 after the second voltage switching process on the basis of the first pump cell current Ip1.

Figure 9A:
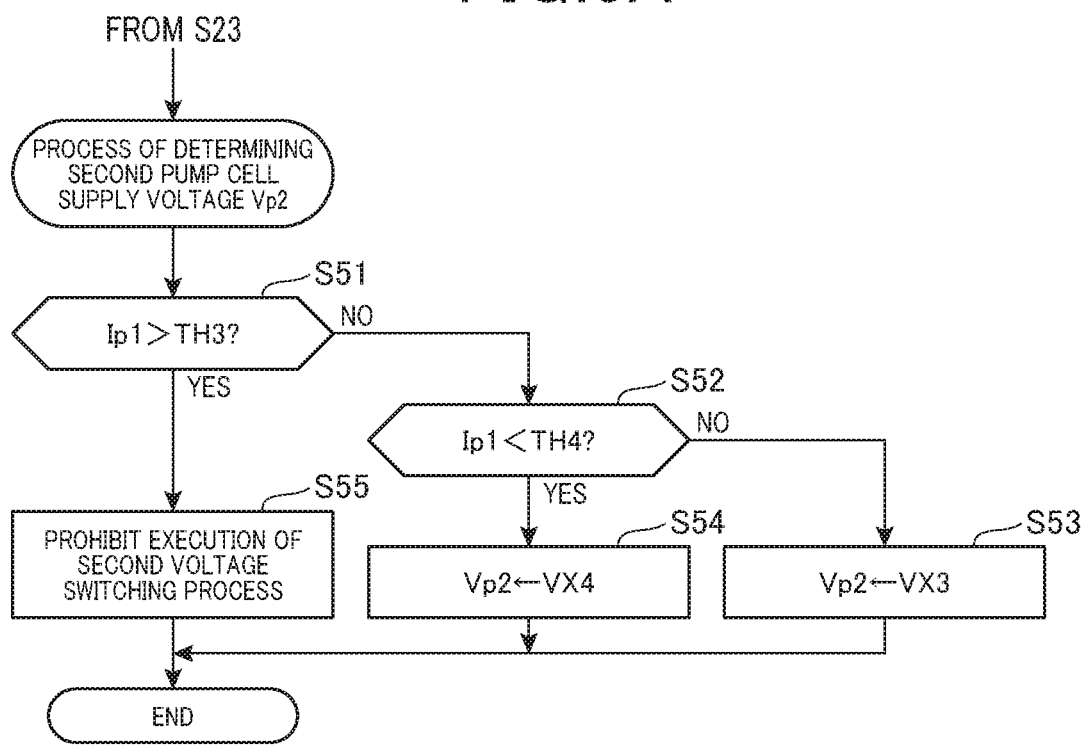
FIG. 9A is a flow chart showing a subroutine of determining a second pump cell supply voltage.

FIG. 9A is a flow chart showing the subroutine to determine the second pump cell supply Vp2.

In step S23 shown in FIG. 7 and FIG. 9A, in order to adjust the variation range of the pump cell current Ip, before and after the execution of the second voltage switching process, to be within a predetermined variation range, each of the SCUs 31 to 33 detects whether the first pump cell current Ip1 before the second voltage switching process is within a range from a threshold TH3 to a threshold value TH4.

In step S23, each of the SCUs 31 to 33 determines the second pump cell supply voltage Vp2, as the pump cell supply voltage after the second voltage switching process, on the basis of the detection result in step S23. There is a relationship TH3>TH4 is satisfied.

In step S51 shown in FIG. 9A, the SCU detects whether the first pump cell current Ip1 is more than the threshold value TH3. When the detection result in step S51 indicates that the first pump cell current Ip1 is not more than the threshold value TH3 ("NO" in step S51), the operation flow progresses to step S52.

In step S52, the SCU detects whether the first pump cell current Ip1 is less than the threshold value TH4. When the detection result in step S52 indicates that the first pump cell current Ip1 is not less than the threshold value TH4 ("NO" in step S52), i.e. indicates that the first pump cell current Ip1 is within the range from TH4 to TH3, the operation flow progresses to step S53.

In step S53, the SCU selects a predetermined voltage VX3 as the second pump cell supply voltage Vp2.

When the first pump cell current Ip1 is less than TH4 (Ip1<TH4, "YES" in step S52), the operation flow progresses to step S54. In step S54, the SCU selects a predetermined voltage VX4, which is lower than VX3, as the second pump cell supply voltage Vp2.

In this case, when Ip1>TH4, it can be considered that the first pump cell supply voltage Vp1 becomes small after the execution of the first voltage switching process. In this case, the use of the predetermined voltage VX4 as the second pump cell supply voltage Vp2 limits the switching range of the pump cell supply voltage Vp.

In step S51, when Ip1>TH3 (i.e. "YES" in step S51), the operation flow progresses to step S55.

In step S55, the SCU prohibits the execution of the second voltage switching process because the pump cell current Ip, i.e. the first pump cell current Ip1 is larger than the predetermined switching permission current value. That is, TH3 corresponds to the predetermined switching permission current value. When the switching process of the pump cell supply voltage Vp is prohibited, the execution of the processes in step S24 to step S31 shown in FIG. 7 is temporarily stopped.

Figure 9B:
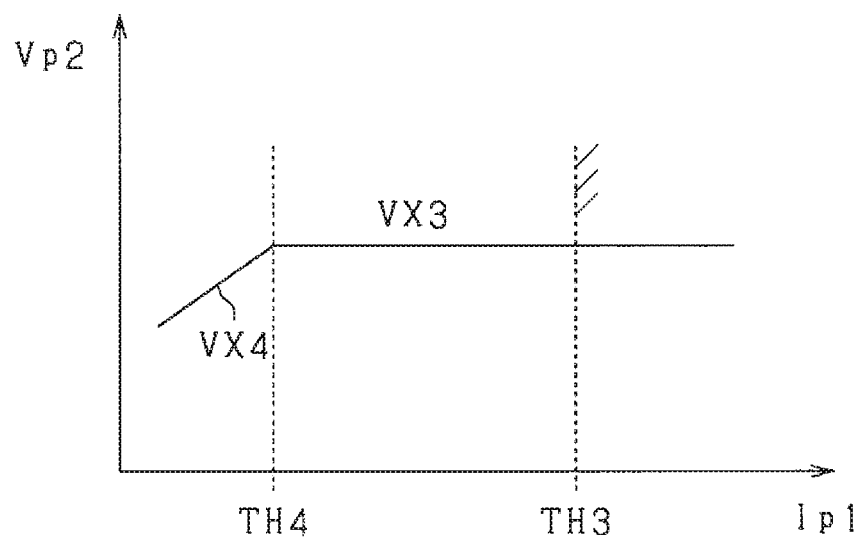
FIG. 9B is a graph showing a relationship between a first pump cell current and the second pump cell supply voltage.

FIG. 9B is a graph showing a relationship between the first pump cell current Ip1 and the second pump cell supply voltage Vp2. The predetermined voltage VX3 and the predetermined voltage VX4 previously described have the relationship shown in FIG. 9B.

When Ip1>TH4, the smaller the first pump cell current Ip1 is, the lower the second pump cell supply voltage Vp2 after the second voltage switching process is determined. When the relationship of VX3>VX4 is satisfied, it is possible to use a constant voltage value as the predetermined voltage VX4.

In the timing charts shown in FIG. 4A to FIG. 4C, the smaller the first pump cell current Ip1 is, before and after the voltage switching process, the larger the change amount ΔIp of the pump cell current Ip is. For this reason, the change amount of the output sensor current Is becomes large due to an excessive current change amount ΔIp of the pump cell current Ip, and this reduces the detection accuracy of the deteriorated state. Because the first exemplary embodiment determines the second pump cell supply voltage Vp2 as previously described, it is possible to optimize the change amount of the first pump cell current Ip1.

When the first pump cell current Ip1 before the second voltage switching process is an excessively small value (which is larger than the predetermined switching permission current value), because a necessary change amount of the concentration of oxygen in the gas chamber 61 is not generated, this reduces the accuracy of the deteriorated state detection. On the other hand, because the SCU according to the first exemplary embodiment prohibits the execution of the second voltage switching process of the pump cell supply voltage Vp when Ip1>TH3, it is possible to correctly change the concentration of oxygen in the gas chamber 61.

In step S24 shown in FIG. 7, the SCU switches the pump cell supply voltage Vp from the first pump cell supply voltage Vp1 to the second pump cell supply voltage Vp2 at timing t2 shown in FIG. 4A. The operation flow progresses to step S25.

In step S25, the SCU detects a sensor cell current Is3 at the start point P3 and a sensor cell current Is4 at the end point P4 in the second voltage switching process. The operation flow progresses to step S26.

In step S26, the SCU detects the second pump cell current Ip2 as the output of the pump cell 42 after the pump cell supply voltage Vp is switched to the second pump cell supply voltage Vp2 from the first pump cell supply voltage Vp1. The second pump cell current Ip2 is detected at the timing at which the pump cell current Ip becomes stable, after the elapse of the predetermined period counted from the timing t2 when the second voltage switching process is performed. It is acceptable to detect the sensor cell currents Is3 and Is4, and the second pump cell current Ip2 in any order. The operation flow progresses to step S27.

In step S27, the SCU calculates the slope A21 during the transient change of the sensor cell current Is by using the equation (3) on the basis of a second current change amount ΔIs2 (=Is3−Is4) and a time difference Δt2.

$$A21 = \Delta Is2/\Delta t2, \quad (3),$$

where the second current change amount ΔIs2 represents a difference between the sensor cell current Is2 at the start point P3 and the sensor cell current Is3 at the end point P3, and the time difference Δt2 is a period counted from a timing at the start point P3 to a timing at the end point P4. The second current change amount ΔIs2 corresponds to a second change amount. The slope A20 in the initial state shown in FIG. 4C can be calculated by using equation (3). The operation flow progresses to step S28.

In step S28, the SCU normalizes the slope A21 to obtain a normalized slope B21. In the normalization process, the SCU calculates the normalized slope B21 by using equation (4) on the basis of the slope A21 during the transient change of the sensor cell current Is and the change amount ΔIp2 (=Ip2−Ip1) of the pump cell current Ip due to the voltage switching process of the pump cell supply voltage Vp.

$$B21 = A21/\Delta Ip2, \quad (4).$$

The operation flow progresses to step S29.

In step S29, the SCU selects the slope B11 obtained in the first voltage switching process or the slope B21 obtained in the second voltage switching process. In other words, the SCU selects, as the slope B, the change amount ΔIs1 of the sensor cell current Is or the change amount ΔIs2 of the sensor cell current Is having a larger difference from the reference change amount of the sensor cell 42 in the initial characteristics, where the change amount ΔIs1 of the sensor cell current Is is obtained in the first voltage switching process, and the change amount ΔIs2 of the sensor cell current Is is obtained in the second voltage switching process. Specifically, as shown in FIG. 4C, the SCU calculates the difference between the slope A11 (as the actual slope) and the slope A10 (as the initial slope), and further calculates the difference between the slope A21 (as the actual slope) and the slope A20 (as the initial slope). The SCU selects the slope having the larger difference from the initial slope. The operation flow progresses to step S30.

FIG. 10 is a graph showing a relationship between a reaction speed ratio BM0 and a deteriorated state ratio in the NOx gas sensor. In FIG. 10, reference character B represents one of the slope B11 and the slope B21 selected in step S29, and reference character B0 represents a slope of the sensor cell current Is when the sensor cell 42 has the initial characteristics, which is not deteriorated.

In step S30, the SCU calculates the sensor cell deteriorated state ratio C (%) on the basis of the slope B selected in step S29. In step S30, the ECU calculates the reaction speed ratio B/B0 between the slope B and the slope B0 at the initial characteristics. For example, the SCU uses the relationship shown in FIG. 10 so as to calculate the sensor cell deteriorated state ratio C (%) on the basis of the reaction speed ratio B/B0. That is, the reaction speed ratio B/B0 represents a ratio of the reaction speed of oxygen supplied to the sensor cell 42. The memory (not shown) in each of the SCUs 31 to 33 stores information regarding the slope B representing the initial characteristics of the sensor cell 42, the slope A10 and the slope A20.

In the relationship shown in FIG. 10, the smaller the reaction speed ratio B/B0 is, i.e. the larger the difference between the deteriorated state characteristics of the sensor cell 42 and the initial characteristics of the sensor cell 42, the larger the deteriorated state ratio C of the sensor cell 42 is. The operation flow progresses to step S31.

In step S31, the SCU transmits the deteriorated state ratio C of the sensor cell 42 to the engine ECU 35.

After the calculation of the deteriorated state ratio C of the sensor cell 42, each of the SCUs 31 to 33 corrects the sensor cell current Is in each of the NOx sensors 21 to 23 on the basis of the deteriorated state ratio C of the sensor cell 42. After this correction of the sensor cell current Is in each of the NOx sensors 21 to 23, each of the SCUs 31 to 33 calculates the concentration of NOx on the basis of the corrected sensor cell current Is so that the current sensor cell characteristics are returned to the initial sensor cell characteristics.

The gas sensor control device according to the first exemplary embodiment previously described has the following superior effects.

It can be considered that the pump cell supply voltage Vp and the pump cell current Ip before the deteriorated state detection process of the sensor cell 42 depend on a concentration of oxygen contained in exhaust gas in the gas chamber 61, and have a given value.

In a case in which exhaust gas before the execution of the voltage switching process of the pump cell supply voltage Vp has a high concentration of oxygen, the change amount ΔIp of the pump cell current Ip when the pump cell supply voltage Vp is switched has an excessive value. This adversely influences the deteriorated state detection of the sensor cell 42 performed on the basis of the change amount ΔIs of the sensor cell current Is. In order to avoid this drawback, the gas sensor control device, the SCUs 31 to 33 and the engine ECU 35 according to the first exemplary embodiment adjust the change amount ΔIp of the pump cell current Ip as the variation range of the pump cell current Ip, before and after the execution of the voltage switching process of the pump cell supply voltage Vp, to be within the predetermined variation range. This makes it possible to suppress the detection accuracy of the deteriorated state detection of the sensor cell 42 from being deteriorated. As a result, it is possible for the gas sensor control device according to the first exemplary embodiment to correctly perform the deteriorated state detection of the sensor cell 42.

The gas sensor control device according to the first exemplary embodiment has the improved structure that determines the first pump cell supply voltage Vp1 or the second pump cell supply voltage Vp2 after the voltage switching process on the basis of the pump cell current Ip before the voltage switching process of the pump cell supply voltage Vp. This structure makes it possible to have a proper value of the pump cell supply voltage Vp after the voltage switching process even if the pump cell current Ip has a given value before the voltage switching process of the pump cell supply voltage Vp. It is therefore possible for the gas sensor control device according to the first exemplary embodiment to adjust the change amount ΔIp of the pump cell current Ip as the variation range of the pump cell current Ip, before and after the execution of the voltage switching process of the pump cell supply voltage Vp, within the predetermined variation range.

In a case in which the first voltage switching process of the pump cell supply voltage Vp is performed so as to increase the concentration of oxygen in the gas chamber 61, when the initial pump cell current Ip0 before the voltage switching process is a significantly large value, the change amount ΔIp of the pump cell current Ip before and after the voltage switching process of the pump cell supply voltage Vp is significantly large, and this reduces the accuracy of the deteriorated state detection of the sensor cell 42.

On the other hand, when the initial pump cell current Ip0 before the voltage switching process of the pump cell supply voltage Vp is larger than the predetermined value, the gas sensor control device according to the first exemplary embodiment increases the first pump cell supply voltage Vp1 after the voltage switching process more than the first Vp1 when the pump cell current Ip is smaller than the predetermined value. This control makes it possible to correctly detect the sensor cell deteriorated state ratio while considering that the pump cell current Ip becomes a given value before the voltage switching process of the pump cell supply voltage Vp.

In a case in which the first voltage switching process is performed, when exhaust gas contains oxygen of a low concentration and the initial pump cell current Ip0 before the first voltage switching process is an excessively small value, the change amount of oxygen due to the voltage switching process of the pump cell supply voltage Vp becomes an excessively small value, and this reduces the accuracy of the deteriorated state detection of the sensor cell 42.

On the other hand, when the initial pump cell current Ip0 before the voltage switching process of the pump cell supply voltage Vp is smaller than the predetermined switching permission current value, the gas sensor control device according to the first exemplary embodiment prohibits the execution of the voltage switching process of the pump cell supply voltage Vp. This control makes it possible to correctly detect the sensor cell deteriorated state ratio.

In a case in which the voltage switching process of the pump cell supply voltage Vp is performed so as to reduce the concentration of oxygen in the gas chamber 61, when the first pump cell current Ip1 before the execution of the voltage switching process is a significantly small value, the change amount ΔIp of the pump cell current Ip before and after the voltage switching process of the pump cell supply voltage Vp becomes a significantly large value, and this reduces the accuracy of the deteriorated state detection of the sensor cell 42.

On the other hand, when the first pump cell current Ip1 before the voltage switching process of the pump cell supply voltage Vp is smaller than the predetermined value, the gas sensor control device according to the first exemplary embodiment reduces the second pump cell supply voltage Vp2 after the voltage switching process more than the Vp2 when the pump cell current Ip is larger than the predetermined value. This control makes it possible to correctly detect the sensor cell deteriorated state ratio while considering that the pump cell current Ip becomes a given value before the voltage switching process of the pump cell supply voltage Vp.

In a case in which the second voltage switching process is performed, when the first pump cell current Ip1 before the second voltage switching process is a large value, the change amount of oxygen due to the voltage switching process of the pump cell supply voltage Vp becomes significantly small, and this reduces the accuracy of the deteriorated state detection of the sensor cell 42.

On the other hand, when the first pump cell current Ip1 before the voltage switching process of the pump cell supply voltage Vp is smaller than the predetermined switching permission current value, the gas sensor control device according to the first exemplary embodiment prohibits the execution of the voltage switching process of the pump cell supply voltage Vp. This control makes it possible to correctly detect the sensor cell deteriorated state ratio.

Each of the SCUs 31 to 33 and the engine ECU 35 as the gas sensor control device according to the first exemplary embodiment has the improved structure configured to detect the deteriorated state of the sensor cell 42 on the basis of the first current change amount ΔIs1 of the sensor cell current Is when the first voltage switching process is performed and the second current change amount ΔIs2 of the sensor cell current Is when the second voltage switching process is performed.

This improved structure of the gas sensor control device makes it possible to obtain the deteriorated state detection parameter of the sensor cell 42 twice during the first voltage switching process to reduce the pump cell supply voltage Vp and the second voltage switching process to increase the pump cell supply voltage Vp. In this case, the gas sensor control device according to the first exemplary embodiment correctly detects the deteriorated state, i.e. the deteriorated state degree of the sensor cell 42 while considering the transient response characteristics of the sensor cell 42 when the concentration of oxygen has been increased, and the transient response characteristics of the sensor cell 42 when the concentration of oxygen has been reduced.

The gas sensor control device according to the first exemplary embodiment calculates the change amount ΔIp1 of the pump cell current Ip during the first voltage switching process and the change amount ΔIp2 of the pump cell current Ip during the second voltage switching process. Further, the gas sensor control device according to the first exemplary embodiment detects the deteriorated state of the sensor cell 42 on the basis of one of the change amount ΔIp1 and the change amount ΔIp2, which is more different from the reference change amount. In this case, it is possible for the gas sensor control device according to the first exemplary embodiment to correctly detect the deteriorated state or the deteriorated state degree of the sensor cell 42 even if the deterioration occurs in one of the transient response characteristics of the sensor cell 42 when the concentration of oxygen is increased and the transient response characteristics of the sensor cell 42 when the concentration of oxygen is reduced.

Because the sensor cell deteriorated state ratio or the deteriorated state degree of the sensor cell 42 obtained on the basis of the change of the transient response characteristics can be obtained by using the slope parameter which represents the transient slope in the transient response characteristics of the sensor cell current Is due to the voltage switching process of the pump cell supply voltage Vp, it is possible to obtain the deteriorated state degree of the sensor cell 42 on the basis of the variation of the transient response characteristics, and to calculate the sensor cell deteriorated state ratio of the sensor cell 42 with high accuracy.

Further, because the gas sensor control device according to the first exemplary embodiment calculates the deteriorated state ratio of the sensor cell 42 on the basis of the slope parameter during the change of the transient response characteristics, it is possible to reduce the period of time to perform the deteriorated state detection of the sensor cell 42, and to perform the deteriorated state detection of the sensor cell 42 without waiting the period of time required for the transient response to become stable.

In a case in which the voltage switching process of the pump cell supply voltage Vp is performed and the deteriorated state detection process of the sensor cell 42 is then performed, the gas sensor control device according to the first exemplary embodiment prohibits the abnormality detection of the sensor circuit part 36. This control makes it possible to suppress occurrence of the incorrect detection regarding the abnormality state of the sensor circuit part 36 when the voltage switching process of the pump cell supply voltage Vp is forcedly performed.

Second Exemplary Embodiment

A description will be given of the gas sensor control device according to the second exemplary embodiment with reference to FIG. 11. Each of the SCUs 31 to 33 as the gas sensor control device according to the second exemplary embodiment calculates the sensor cell deteriorated state ratio C1 on the basis of the slope B11 of the sensor cell current Is when the first voltage switching process of the pump cell supply voltage Vp is performed. Further, each of the SCUs 31 to 33 calculates the sensor cell deteriorated state ratio C2 on the basis of the slope B21 of the sensor cell current Is when the second voltage switching process of the pump cell supply voltage Vp is performed. The SCU transmits the sensor cell deteriorated state ratio C1 and the sensor cell deteriorated state ratio C2 to the engine ECU 35.

Figure 11:
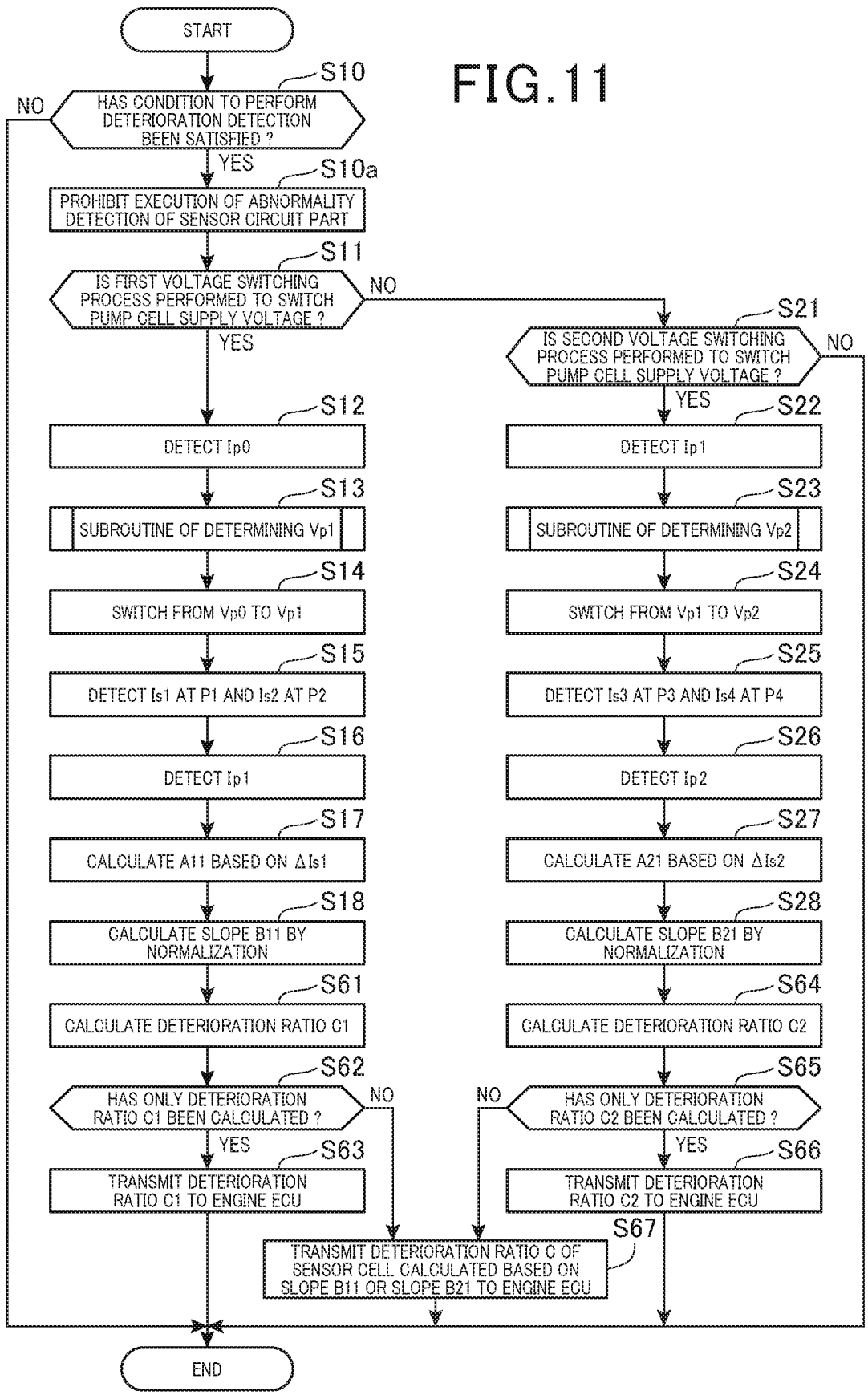
FIG. 11 is a flow chart showing the deteriorated state detection process of the sensor cell performed by the gas sensor control device according to a second exemplary embodiment of the present invention.

FIG. 11 is a flow chart showing the deteriorated state detection process of the sensor cell 42 performed by the gas sensor control device according to the second exemplary embodiment of the present invention. As shown in FIG. 11, the SCU performs the deteriorated state detection process shown in FIG. 11 instead of performing the deteriorated state detection process shown in FIG. 7. The same steps in the flow chart shown in FIG. 11 and the flow chart shown in FIG. 7 will be designated by the same reference characters. The explanation of the same steps is omitted here for brevity. The difference between the flow chart shown in FIG. 11 and the flow chart shown in FIG. 7 will be explained.

In step S18 in the flow chart shown in FIG. 11, the SCU calculates the slope B11 by normalization when the first voltage switching process is performed. The operation flow progresses to step S61.

In step S61, the SCU calculates the sensor cell deteriorated state ratio C1 (%) on the basis of the calculated slope B11. The operation flow progresses to step S62.

In step S62, the SCU determines whether the sensor cell deteriorated state ratio C1 (%) should be transmitted to the engine ECU 35. In more detail, the SCU detects whether the C1 has been calculated only, and C2 has not been calculated.

When the detection result in step S62 indicates affirmation ("YES" in step S62), i.e. indicates that the sensor cell deteriorated state ratio C1 has been calculated and the sensor cell deteriorated state ratio C2 has not been calculated, the operation flow progresses to step S63.

In step S63, the SCU transmits the sensor cell deteriorated state ratio C1 calculated in step S61 to the engine ECU 35.

In step S28 in the flow chart shown in FIG. 11, the SCU calculates the slope B21 by normalization when the second voltage switching process is performed. The operation flow progresses to step S64.

In step S64, the SCU calculates the sensor cell deteriorated state ratio C2 (%) on the basis of the calculated slope B21. The operation flow progresses to step S65.

In step S65, the SCU determines whether the sensor cell deteriorated state ratio C2 (%) should be transmitted to the engine ECU 35. In more detail, the SCU detects whether the sensor cell deteriorated state ratio C2 (%) has been calculated and the sensor cell deteriorated state ratio C1 (%) has not been calculated.

When the detection result in step S65 indicates affirmation ("YES" in step S65), i.e. indicates that the sensor cell deteriorated state ratio C2 has been calculated and the sensor cell deteriorated state ratio C1 has not been calculated, the operation flow progresses to step S66.

In step S66, the SCU transmits the sensor cell deteriorated state ratio C2 (%) calculated in step S64 to the engine ECU 35.

On the other hand, when the detection result in step S62 indicates negation ("NO" in step S62), the operation flow progresses to step S67. Further, when the detection result in step S65 indicates negation ("NO" in step S65), the operation flow progresses to step S67.

In step S67, the SCU calculates the deteriorated state ratio C (%) of the sensor cell 42 calculated on the basis of one of the slope B11 or the slope B21.

The SCU transmits the calculated sensor cell deteriorated state ratio C (%) of the sensor cell 42 to the engine ECU 35. In step S67, it is preferable for the SCU to select one of the change amount $\Delta Is1$ of the sensor cell current Is and the change amount $\Delta Is2$ of the sensor cell current Is, which has a larger difference from the reference change amount of the sensor cell 42 in the initial characteristics. In this case, the change amount $\Delta Is1$ of the sensor cell current Is is obtained during the first voltage switching process. On the other hand, the change amount $\Delta Is2$ of the sensor cell current Is is obtained during the second voltage switching process. Further, it is preferable for the SCU to calculate the sensor cell deteriorated state ratio C (%) on the basis of the selected change amount of the sensor cell current Is.

Third Exemplary Embodiment

A description will be given of the gas sensor control device according to the third exemplary embodiment with reference to FIG. 12. Each of the SCUs 31 to 33 as the gas sensor control device according to the third exemplary embodiment performs the abnormality detection process of the pump cell 41 on the basis of the change amount $\Delta Ip$ of the pump cell current Ip before and after the voltage switching process of the pump cell supply voltage Vp. Each of the SCUs 31 to 33 serves as, i.e. corresponds to the pump cell abnormality detection part.

Figure 12:
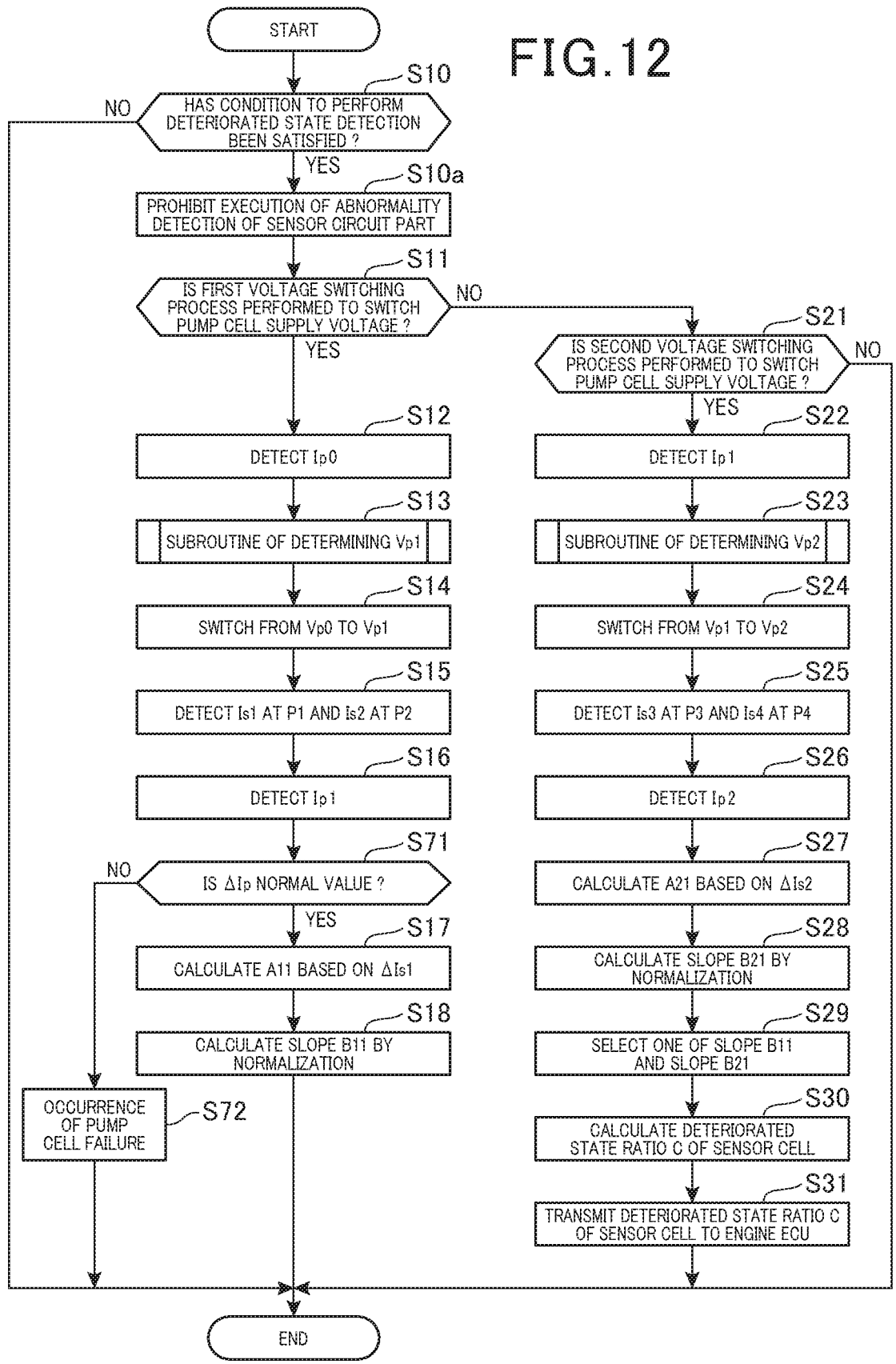
FIG. 12 is a flow chart showing the deteriorated state detection process of the sensor cell performed by the gas sensor control device according to a third exemplary embodiment of the present invention.

FIG. 12 is a flow chart showing the deteriorated state detection process of the sensor cell 42 performed by the gas sensor control device according to the third exemplary embodiment of the present invention. As shown in FIG. 12, the SCU performs the deteriorated state detection process shown in FIG. 12 instead of performing the deteriorated state detection process shown in FIG. 7.

The same steps in the flow chart shown in FIG. 12 and the flow chart shown in FIG. 7 will be designated by the same reference characters. The explanation of the same steps is omitted here for brevity. The difference between the flow chart shown in FIG. 12 and the flow chart shown in FIG. 7 will be explained.

In step S16 shown in FIG. 12, the SCU detects the pump cell current Ip1 after the execution of the voltage switching process. The operation flow progresses to step S71.

In step S71 shown in FIG. 12, the SCU detects whether the change amount $\Delta Ip$ of the pump cell current Ip is a normal value, i.e. an acceptable value. In other words, the SCU detects whether the change amount $\Delta Ip$ ($=Ip0-Ip1$) of the pump cell current Ip before and after the voltage switching process of the pump cell supply voltage Vp is to be within the predetermined current range.

It is preferable to determine the predetermined current range of the pump cell current Ip on the basis of the pump cell supply voltage Vp0 before the voltage switching process and the pump cell supply voltage Vp1 after the voltage switching process.

When the detection result in step 71 indicates affirmation ("YES" in step S71), i.e. indicates that the change amount $\Delta Ip$ of the pump cell current Ip is the normal value, the operation flow progresses to step S17.

On the other hand, when the detection result in step 71 indicates negation ("NO" in step S71), i.e. indicates that the change amount $\Delta Ip$ of the pump cell current Ip is not the normal value, the operation flow progresses to step S72.

In step S72, the SCU determines that the pump cell failure has occurred. The SCU finishes the deteriorated state detection process shown in FIG. 12. That is, the SCU prohibits the execution of the deteriorated state detection process shown in FIG. 12.

It is possible for the SCU as the gas sensor control device according to the third exemplary embodiment to correctly detect occurrence of the pump cell failure on the basis of the change amount $\Delta Ip$ of the pump cell current Ip before and after the voltage switching process of the pump cell supply voltage Vp. This often causes incorrect deteriorated state detection of the sensor cell 42. On the other hand, because the gas sensor control device according to the third exemplary embodiment prohibits the execution of the deteriorated state detection process of the sensor cell 41 when the abnormality of the pump cell 41 occurs. This control makes it possible to suppress incorrect deteriorated state detection of the sensor cell 42.

Various Modifications

A description will now be given of various modifications of the gas sensor control device according to the first to third exemplary embodiments.

It is acceptable for the SCU to prohibit the voltage supply to the pump cell 41 from being performed, or to supply a pump cell supply voltage Vp of a negative value to the pump cell 41 when the SCU switches the pump cell supply voltage Vp (in the first voltage switching process) so as to increase the concentration of oxygen in the gas chamber 61 during the deteriorated state detection of the sensor cell 42. In both the cases, it is possible to increase the concentration of oxygen in the gas chamber 61 in accompaniment with the execution of the voltage switching process of the pump cell supply voltage Vp, and it is possible to perform the deteriorated state detection of the sensor cell 42 on the basis of the transient response of the sensor cell 42.

In the exemplary embodiments previously described, each of the ECUs 31 to 33 calculates the sensor cell deteriorated state ratio C, i.e. performs the deteriorated state detection of the sensor cell 42 on the basis of the change amount $\Delta Is1$ and the change amount $\Delta Is2$ of the sensor cell current Is. However, the concept of the present invention is not limited by this. For example, it is acceptable for each of the ECUs 31 to 33 to transmit data regarding the change amount $\Delta Is1$ and the change amount $\Delta Is2$ of the sensor cell current Is, and for the engine ECU 35 to receive the data regarding the change amount $\Delta Is1$ and the change amount $\Delta Is2$ of the sensor cell current Is. In this case, the engine ECU 35 acts as the gas sensor control device to calculate the sensor cell deteriorated state ratio C (%) on the basis of the received data regarding the received change amount $\Delta Is1$ of the sensor cell current Is and the received change amount $\Delta Is2$ of the sensor cell current Is.

It is also acceptable to have a structure in which both the SCUs 31 to 33 and the engine ECU 35 calculate the change amount $\Delta Is1$ and the change amount $\Delta Is2$ of the sensor cell current Is, i.e. perform the deteriorated state detection of the sensor cell 42.

In the exemplary embodiments previously described, the slope of the transient change is calculated as the slope parameter of the sensor cell current Is on the basis of the current change amount ΔIs per unit time Δt during the transition period of the sensor cell current Is.

However, the concept of the present invention is not limited by this. It is acceptable for each of the ECUs 31 to 33 to use, as the slope parameter of the sensor cell current Is, the current change amount ΔIs of the sensor cell current Is during a predetermined period of time. It is also acceptable to use a time length to a predetermined current change amount as the slope parameter of the sensor cell current Is. It is sufficient to calculate and use a variable as the slope parameter which correlates with the slope of the sensor cell current Is.

In the first voltage switching process, the pump cell supply voltage Vp is switched so as to increase the concentration of oxygen in the gas chamber 61. In the second voltage switching process performed after the first voltage switching process, the pump cell supply voltage Vp is switched so as to reduce the concentration of oxygen in the gas chamber 61. It is acceptable for the gas sensor control device to perform the deteriorated state detection of the sensor cell 42 in the second voltage switching process only on the basis of the change amount (i.e. the slope of) the sensor cell current Is.

The gas sensor control device according to the exemplary embodiments previously described has the structure in which the slope A11 and the slope A21 of the sensor cell current Is are normalized to obtain the slope B11 and B21, and the sensor cell deteriorated state ratio C (%) is calculated on the basis of the slopes bll and B21. However, the concept of the present invention is not limited by this structure. It is acceptable for the gas sensor control device to calculate the sensor cell deteriorated state ratio C (%) on the basis of the slopes A11 and A21.

In the gas sensor control device according to the exemplary embodiments previously described, it is possible to calculate the sensor cell deteriorated state ratio C (%) on the basis of data other than the slope parameter of the sensor cell current Is. For example, it is possible to calculate a convergence value in change of the sensor cell current Is after the voltage switching process of the pump cell supply voltage Vp, and to use the convergence value as the change amount ΔIs of the sensor cell current Is. In this case, it is possible to calculate the sensor cell deteriorated state ratio C (%) on the basis of the calculated change amount ΔIs of the sensor cell current Is.

The gas sensor control device according to the exemplary embodiments has the structure previously described in which the deteriorated state ratio C (%) of the sensor cell 42 is the ratio of the current characteristics to the initial characteristics of the sensor cell 42. However, the concept of the present invention is not limited by this. For example, it is possible for the gas sensor control device to detect the sensor cell deteriorated state ratio on the basis of: a difference of the slope of the sensor cell current Is or a correlation value of the slope of the sensor cell current Is, as the deteriorated state detection parameter of the sensor cell 42, from the initial value; or a difference of the change amount ΔIs of the sensor cell current Is after the convergence of the sensor cell current Is.

It is acceptable to compare the slope of the sensor cell current with a predetermined value instead of the initial value.

It is further acceptable to detect the sensor cell deteriorated state ratio on the basis of a value (=100%—the deteriorated state ratio C (%)). In this case, the sensor cell deteriorated state ratio in the initial characteristics becomes 100%. The more the deteriorated state of the sensor cell 42 progresses, the smaller the sensor cell deteriorated state ratio is.

It is acceptable to use a deteriorated state parameter which corresponds to the characteristics change of the sensor cell 42, i.e. corresponds to the deteriorated state of the sensor cell 42.

The gas sensor control device according to the exemplary embodiments has the sensor element 40 composed of the solid electrolyte body 53 and the gas chamber 61. However, the concept of the present invention is not limited by this. It is acceptable for each of the NOx sensors 21 to 23 to have a sensor element composed of a plurality of solid electrolyte bodies, a plurality of gas chambers, and a plurality of solid electrolyte bodies, for example.

FIG. 13 is a view showing a cross section of a structure of the NOx sensor according to a modification of the first to third exemplary embodiments of the present invention. As shown in FIG. 13, the sensor element 40 in the NOx sensor is composed of two solid electrolyte bodies 53a and 53b, and two gas chambers 61a and 61b. The gas chambers 61a and 61b are formed between the two solid electrolyte bodies 53a and 53b. The gas chamber 61a communicates with the exhaust gas inlet part 53c, and the gas chamber 61b communicates with the gas chamber 61a through a throttle part 71. The pump cell 41 has a pair of electrodes 72 and 73. One of the electrodes, i.e. the electrode 72 is exposed in the inside of the gas chamber 61a. The sensor cell 42 has the electrode 74 and the common electrode 76 which face each other. The monitor cell 43 has the electrode 75 and the common electrode 76 which face with each other. The sensor cell 42 and the monitor cell 43 are arranged adjacently with each other. One of the electrode 74 and the electrode 75 is arranged to expose it to the inside of the gas chamber 61b.

It is possible for the gas sensor control device according to the modification of the embodiments to correctly perform the deteriorated state detection of the sensor cell 42 in the sensor element 40 in which the pump cell 41 and the sensor cell 42 are arranged in the different gas chambers 61a and 61b, respectively.

It is possible for the sensor element 40 in each of the NOx sensors 21 to 23 to have a double cell structure having the pump cell and the sensor cell.

It is acceptable to apply the gas sensor control device to another sensor which detects a gas component as a detection target gas except for NOx. For example, it is possible for the gas sensor control device to detect the deteriorated state of a gas sensor capable of detecting a concentration of hydro carbon (HC) or carbon monoxide (CO) contained in atmosphere. In this case, it is possible for the pump cell to discharge oxygen from exhaust gas, and for the sensor cell to decompose exhaust gas, from which oxygen has been discharged, and to detect a concentration of HC and a concentration of CO. It is further acceptable to apply the gas sensor control device to a gas sensor capable of detecting a concentration of ammonia gas contained in a detection target gas.

It is possible to apply the gas sensor control device to various types of gas sensors capable of detecting detection target gases in addition to exhaust gas, mounted on petrol engines (or gasoline engines) and other types of engines in addition to diesel engines which are mounted on various types of vehicles and machines.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A gas sensor control device capable of controlling a gas sensor, the gas sensor comprising a pump cell, a sensor cell and a gas chamber, the pump cell receiving a pump cell supply voltage and adjusting a concentration of an oxygen gas component contained in a detection target gas introduced into the gas chamber on the basis of the received pump cell supply voltage, the sensor cell detecting a concentration of a specific gas component contained in the detection target gas after the pump cell has adjusted the concentration of the oxygen gas component contained in the detection target gas, the gas sensor control device comprising a computer system comprising a central processing unit, the computer system being configured to provide:
a voltage switching part capable of executing a voltage switching process of switching the pump cell supply voltage to be supplied to the pump cell in the gas sensor;
a pump cell output control part capable of adjusting a variation range of a pump cell output current of the pump cell, before and after the execution of the voltage switching process, to be within a predetermined variation range; and
a deteriorated state detection part capable of detecting a deteriorated state of the sensor cell on the basis of variation of an output of the sensor cell caused by the voltage switching process performed by the voltage switching part,
wherein the pump cell output control part comprises a voltage determining part capable of determining a value of the pump cell supply voltage after the voltage switching process on the basis of the pump cell output current of the pump cell before the voltage switching process.

2. The gas sensor control device according to claim 1, wherein in a case in which the voltage switching part switches the pump cell supply voltage so as to increase the concentration of oxygen in the gas chamber, when the pump cell output current of the pump cell before the voltage switching process, which is higher than a predetermined value, the voltage setting part determines the pump cell supply voltage after the voltage switching process, which is higher than the pump cell supply voltage determined when the pump cell output current of the pump cell before the voltage switching process is smaller than the predetermined value.

3. The gas sensor control device according to claim 1, wherein in a case in which the voltage switching part switches the pump cell supply voltage so as to reduce the concentration of oxygen in the gas chamber, when the pump cell output current of the pump cell before the voltage switching process is smaller than the predetermined value, the voltage setting part determines the pump cell supply voltage after the voltage switching process, which is smaller than the pump cell supply voltage determined when the pump cell output current of the pump cell before the voltage switching process is higher than the predetermined value.

4. The gas sensor control device according to claim 1, wherein in a case in which the voltage switching part switches the pump cell supply voltage so as to increase the concentration of oxygen in the gas chamber, the pump cell output control part prohibits the voltage switching part from performing the voltage switching process when the pump cell output current of the pump cell before the voltage switching process is smaller than a predetermined switching permission current value.

5. The gas sensor control device according to claim 1, wherein in a case in which the voltage switching part switches the pump cell supply voltage so as to reduce the concentration of oxygen in the gas chamber, the pump cell output control part prohibits the voltage switching part from performing the voltage switching process when the pump cell output current of the pump cell before the voltage switching process is greater than a predetermined switching permission current value.

6. The gas sensor control device according to claim 1, wherein the voltage switching part performs a first voltage switching process of the pump cell supply voltage and a second voltage switching process of the pump cell supply voltage,
in the first voltage switching process the pump cell supply voltage is switched to increase the concentration of oxygen in the gas chamber,
in the second voltage switching process the pump cell supply voltage is switched to reduce the concentration of oxygen in the gas chamber, and
the deteriorated state detection part detects the deteriorated state of the sensor cell on the basis of a first change amount of the sensor cell, and a second change amount of the sensor cell, wherein the first change amount of the sensor cell is a change amount of an output sensor current of the sensor cell when the first voltage switching process is performed, and the second change amount of the sensor cell is a change amount of the output sensor current of the sensor cell when the second voltage switching process is performed.

7. The gas sensor control device according to claim 6, wherein the deteriorated state detection part detects the deteriorated state of the sensor cell on the basis of one of the first change amount of the sensor cell and the second change amount of the sensor cell which is more different from a predetermined reference change amount.

8. The gas sensor control device according to claim 1, wherein the deteriorated state detection part calculates a slope parameter which represents a slope of a change of a sensor cell current of the sensor cell in accompaniment with the voltage switching process performed by the voltage switching part, and determines the deteriorated state of the sensor cell on the basis of the calculated slope parameter.

9. The gas sensor control device according to claim 1, wherein further comprising a circuit diagnosis part and a diagnosis prohibition part, wherein the circuit diagnosis part performs abnormality detection of a sensor circuit part connected to the gas sensor, and the diagnosis prohibition part prohibits the circuit diagnosis part from performing the abnormality diagnosis of the sensor circuit part when the voltage switching part performs the voltage switching process and the deteriorated state detection of the sensor cell in accompaniment with the voltage switching process.

10. The gas sensor control device according to claim 1, further comprising a pump cell abnormality detection part capable of performing the abnormality detection of the pump cell on the basis of the change of the pump cell current of the pump cell before and after the voltage switching process.

* * * * *